US008986803B2

(12) United States Patent
Yoshida et al.

(10) Patent No.: US 8,986,803 B2
(45) Date of Patent: Mar. 24, 2015

(54) LABEL FORMATION BASE MATERIAL PAIR AND TACK LABELER

(75) Inventors: Yasushi Yoshida, Tokyo (JP); Masahide Ikeda, Hirakata (JP); Akihiko Fujihira, Yokohama (JP)

(73) Assignee: Fuji Seal International, Inc., Osaka (JP)

( * ) Notice: Subject to any disclaimer, the term of this patent is extended or adjusted under 35 U.S.C. 154(b) by 60 days.

(21) Appl. No.: 13/389,542

(22) PCT Filed: Sep. 1, 2009

(86) PCT No.: PCT/JP2009/004306
§ 371 (c)(1),
(2), (4) Date: Feb. 8, 2012

(87) PCT Pub. No.: WO2011/027385
PCT Pub. Date: Mar. 10, 2011

(65) Prior Publication Data
US 2012/0141715 A1 Jun. 7, 2012

(51) Int. Cl.
*B32B 9/00* (2006.01)
*B32B 33/00* (2006.01)
(Continued)

(52) U.S. Cl.
CPC ................ *B65C 9/1896* (2013.01); *B31D 1/02* (2013.01); *B65C 9/1884* (2013.01);
(Continued)

(58) Field of Classification Search
CPC ........... G09F 3/10; G09F 3/0288; G09F 3/02; G09F 2003/0257; G09F 2003/0258; G09F 2003/026; G09F 2003/0263; G09F 2003/0264; G09F 2003/0266; G09F 2003/0267; G09F 2003/0269; C09J 2201/28; B31D 1/021; B31D 1/02; B65C 9/1865; B65C 9/1896; B65C 9/1884; B65C 9/1807; B65C 9/1826; B65C 2009/0018; B65C 2009/1846
USPC ................ 156/510, 257; 428/40.1, 41.8, 194, 428/195.1, 354, 103, 42.1
See application file for complete search history.

(56) References Cited

U.S. PATENT DOCUMENTS 3,312,005 A * 4/1967 McElroy .......................... 40/638
4,210,688 A * 7/1980 Sato ............................. 428/42.2
(Continued)

FOREIGN PATENT DOCUMENTS

JP A-05-117604 5/1993
JP A-10-142742 5/1998
WO WO 2009/110197 A1 9/2009

OTHER PUBLICATIONS

Mar. 6, 2012 International Preliminary Report on Patentability issued in PCT/JP2009/004306.
Dec. 15, 2009 International Search Report issued in International Patent Application No. PCT/JP2009/004306.

*Primary Examiner* — Patricia L Nordmeyer
(74) *Attorney, Agent, or Firm* — Oliff PLC

(57) ABSTRACT

A tack labeler includes a reeling-out unit for reeling out a label formation base material pair from a base material pair roll set on a roll holder; a base material pair accumulation unit for accumulating the label formation base material pair; a separating-delivering unit for pulling out the label formation base material pair from the base material pair accumulation unit, separating the label formation base material pair into respective label formation base materials, and delivering the respective label formation base materials; cutting units for successively cutting connection portions of cut lines formed on each of the label formation base materials; adhering units for adhering the tack labels cut off from each of the label formation base materials onto containers conveyed to adherence positions; and base material collecting units for winding up and collecting each of the label formation base materials.

7 Claims, 20 Drawing Sheets

(51) Int. Cl.
*B65C 9/18* (2006.01)
*B31D 1/02* (2006.01)
*B65C 9/00* (2006.01)

(52) U.S. Cl.
CPC ............ *B65C 9/1807* (2013.01); *B65C 9/1826* (2013.01); *B65C 2009/0018* (2013.01); *B65C 2009/1846* (2013.01)
USPC ....... 428/41.8; 428/40.1; 428/195.1; 428/102

(56) References Cited

U.S. PATENT DOCUMENTS

| | | | | |
|---|---|---|---|---|
| 4,335,172 | A * | 6/1982 | Sato | 428/42.3 |
| 5,336,541 | A * | 8/1994 | Kobayashi | 428/41.8 |
| 6,596,359 | B2 * | 7/2003 | Roth et al. | 428/40.1 |
| 7,625,619 | B2 * | 12/2009 | Hodson et al. | 428/40.1 |

* cited by examiner (a)

(a)

(b)

LABEL FORMATION BASE MATERIAL PAIR AND TACK LABELER

TECHNICAL FIELD

The present invention relates to a tack labeler capable of automatically adhering, onto adherence objects, tack labels that do not require a usage of release papers and are punched out in a shape of an ellipse, circle, or the like; and also relates to a label formation base material pair suitable for the tack labeler.

BACKGROUND ART

A general tack label is provided as being adhered to a release paper, and thereby has problems such as a high cost due to having the release paper and a need for disposing the release paper as trash after having a tack label detached therefrom. Therefore, in recent years, two sheets of tack labels are provided in a state of being detachably adhered to each other as a label pair without using a release paper. When using the tack label, the two pieces of tack labels are detached and simultaneously adhered onto two adherence objects.

CITATION LIST

Patent Literature

[PTL 1] Japanese Laid-Open Patent Publication No. H05-117604

SUMMARY OF THE INVENTION

Problems to be Solved by the Invention

However, the two pieces of tack labels that are detachably adhered to each other, in particular, tack labels that are punched out in a shape of an ellipse, circle, or the like, are difficult to handle when compared to the tack labels that are adhered to a release paper. Therefore, such tack labels are generally provided in a sheet form and are manually handled when being adhered.

Therefore, a task of the invention is to provide: a tack labeler capable of automatically adhering, onto adherence objects, tack labels that do not require a usage of release papers and are punched out in a shape of an ellipse, circle, or the like; and a label formation base material pair suitable for the tack labeler.

Solutions to the Problems

In order to achieve the above described task, the invention according to claim 1 provides a label formation base material pair formed by detachably adhering to each other, on respective adherence surface sides, long strip-like label formation base materials used for cutting therefrom tack labels having a predetermined shape; each of the label formation base materials having formed thereon, successively in a longitudinal direction thereof and at a predetermined interval, cut lines with the shape of the tack labels having connection portions that are uncut at one part thereof and that are located at one end side of the tack labels in the longitudinal direction; cut lines formed on one of the label formation base materials and cut lines formed on the other label formation base material being shifted in position so as not to match to each other.

In order to achieve the above described task, the invention according to claim 2 provides a tack labeler comprising: base material pair delivering means for reeling out the label formation base material pair according to claim 1 from a base material pair roll formed by winding the label formation base material pair in a roll shape, and delivering the label formation base material pair from an end on a side of the connection portions of the cut lines having the shape of the tack labels; separating-delivering means for separating the delivered label formation base material pair into the respective label formation base materials, and delivering the respective label formation base materials; cutting means for successively cutting the connection portions formed on each of the separated label formation base materials so as to form individual tack labels; adhering means for adhering the formed individual tack labels onto adherence objects; and base material collecting means for collecting each of the label formation base materials from which the tack labels have been cut off, wherein the separating-delivering means has a pair of separating-delivering rollers that are disposed on both sides of the label formation base material pair so as to nip the label formation base material pair, and that are for delivering each of the separated label formation base materials in directions away from each other while having the label formation base materials follow along outer peripheral surfaces of the separating-delivering rollers.

In order to achieve the above described task, the invention according to claim 3 provides a tack labeler comprising: base material pair delivering means for reeling out, from a base material pair roll formed by winding in a roll shape a label formation base material pair formed by detachably adhering to each other, on respective adherence surface sides, long strip-like label formation base materials used for cutting therefrom tack labels having a predetermined shape, and delivering the label formation base material pair; cut-line forming means for successively forming, on the delivered label formation base material pair, cut lines with the shape of the tack labels having connection portions that are uncut at one part thereof and that are located at a downstream side of a delivering direction; separating-delivering means for separating, into the respective label formation base materials, the label formation base material pair having formed thereon the cut lines having the shape of the tack labels, and delivering the respective label formation base materials; cutting means for successively cutting the connection portions formed on each of the separated label formation base materials so as to form individual tack labels; adhering means for adhering the formed individual tack labels onto adherence objects; and base material collecting means for collecting each of the label formation base materials from which the tack labels have been cut off, wherein the separating-delivering means has a pair of separating-delivering rollers that are disposed on both sides of the label formation base material pair so as to nip the label formation base material pair, and that are for delivering each of the separated label formation base materials in directions away from each other while having the label formation base materials follow along outer peripheral surfaces of the separating-delivering rollers.

In order to achieve the above described task, the invention according to claim 4 provides a tack labeler comprising: base material pair delivering means for reeling out, from a base material pair roll formed by winding in a roll shape a label formation base material pair formed by detachably adhering to each other, on respective adherence surface side, long strip-like label formation base materials used for cutting therefrom tack labels having a predetermined shape, and delivering the label formation base material pair; separating-delivering means for separating the delivered label formation base material pair into respective label formation base materials, and delivering the respective label formation base materials; cut-out means for cutting out each of the separated label formation base materials into the predetermined shape to form individual tack labels; adhering means for adhering the individual tack labels cut out from the label formation base material onto adherence objects; and base material collecting means for collecting each of label formation base materials from which the tack labels have been cut out, wherein the separating-delivering means has a pair of separating-delivering rollers that are disposed on both sides of the label formation base material pair so as to nip the label formation base material pair, and that are for delivering each of the separated label formation base materials in directions away from each other while having the label formation base materials follow along outer peripheral surfaces of the separating-delivering rollers.

Advantageous Effects of the Invention

As described above, in the label formation base material pair which is the invention according to claim 1, formed on the pair of label formation base materials detachably adhered to each other on respective adherence surface sides are cut lines with the shape of the tack labels having connection portions that are uncut at one part thereof and that are located at one end side of the tack labels in the longitudinal direction. Therefore, when the label formation base materials adhered to each other are detached starting at the one end side in the longitudinal direction, cut-line enclosed portions that are to be the tack labels can also be detached and separated with certainty.

Furthermore, on the label formation base material pair, cut lines formed on one of the label formation base materials and cut lines formed on the other label formation base material are shifted in position so as not to match each other. Therefore, the portions enclosed by the cut lines formed on one of the label formation base materials that are to be the tack labels are adhered and held outside the cut-line enclosed portions that are to be the tack labels on the other label formation base material. Thus, the cut-line enclosed portions that are to be the tack labels on both of the label formation base materials do not become loose, and thereby the label formation base material pair can be reeled out and delivered smoothly with certainty.

With the tack labeler, which is the invention according to claim 2 and which is configured as described above, when the separating-delivering roller is rotated in a state where a leading end of the label formation base material pair delivered by the base material pair delivering means is split to follow along the outer peripheral surfaces of the separating-delivering rollers, the two sheets of the label formation base materials that are adhered to each other become separated. Here, since the connection portions of the cut lines formed on the two sheets of label formation base materials are located on the downstream side of the delivering direction of the label formation base materials, the cut-line enclosed portions that are to be tack labels are also separated with certainty due to the connection portions. Then, by successively cutting the connection portions formed on each of the separated label formation base materials by using the cutting means, the individual tack labels are formed and then adhered, with certainty, onto the adherence objects by the adhering means.

With the tack labeler, which is the invention according to claim 3, when the separating-delivering rollers are rotated in a state where a leading end of the label formation base material pair delivered by the base material pair delivering means is split to follow along the outer peripheral surfaces of the separating-delivering rollers, the two sheets of the label formation base materials that are adhered to each other become separated. However, before the two sheets of the label formation base materials are separated, cut lines are successively formed on the label formation base material pair by the cut-line forming means in a shape of the tack labels having the connection portions that are uncut at one part thereof and that are located at a downstream side of the delivering direction. Due to the connection portions, the cut-line enclosed portion that are to be tack labels are also separated with certainty. Then, by successively cutting the connection portions formed on each of the separated label formation base materials by using the cutting means, the individual tack labels are formed and then adhered, with certainty, onto the adherence objects by the adhering means.

With the tack labeler, which is the invention according to claim 4, when the separating-delivering rollers are rotated in a state where a leading end of the label formation base material pair delivered by the base material pair delivering means is split to follow along the outer peripheral surfaces of the separating-delivering rollers, the two sheets of the label formation base material that are adhered to each other become separated. Then, by successively cutting out each of the separated label formation base materials by the cut-out means, the individual tack labels are formed and then adhered, with certainty, onto the adherence objects by the adhering means.

DESCRIPTION OF EMBODIMENTS

Figure 1:
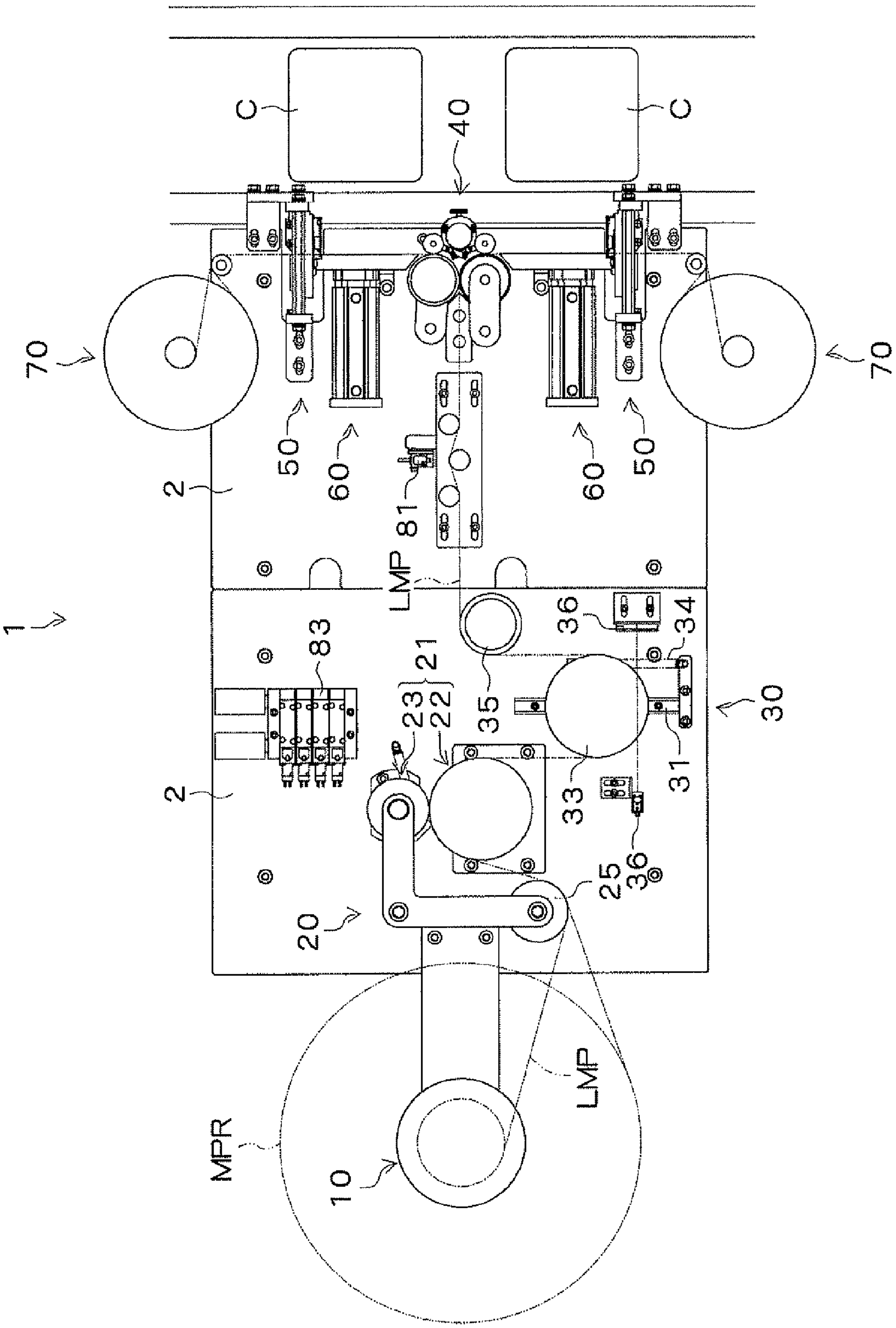
FIG. 1 is a plan view showing one embodiment of a tack labeler according to the present invention.
Figure 2:
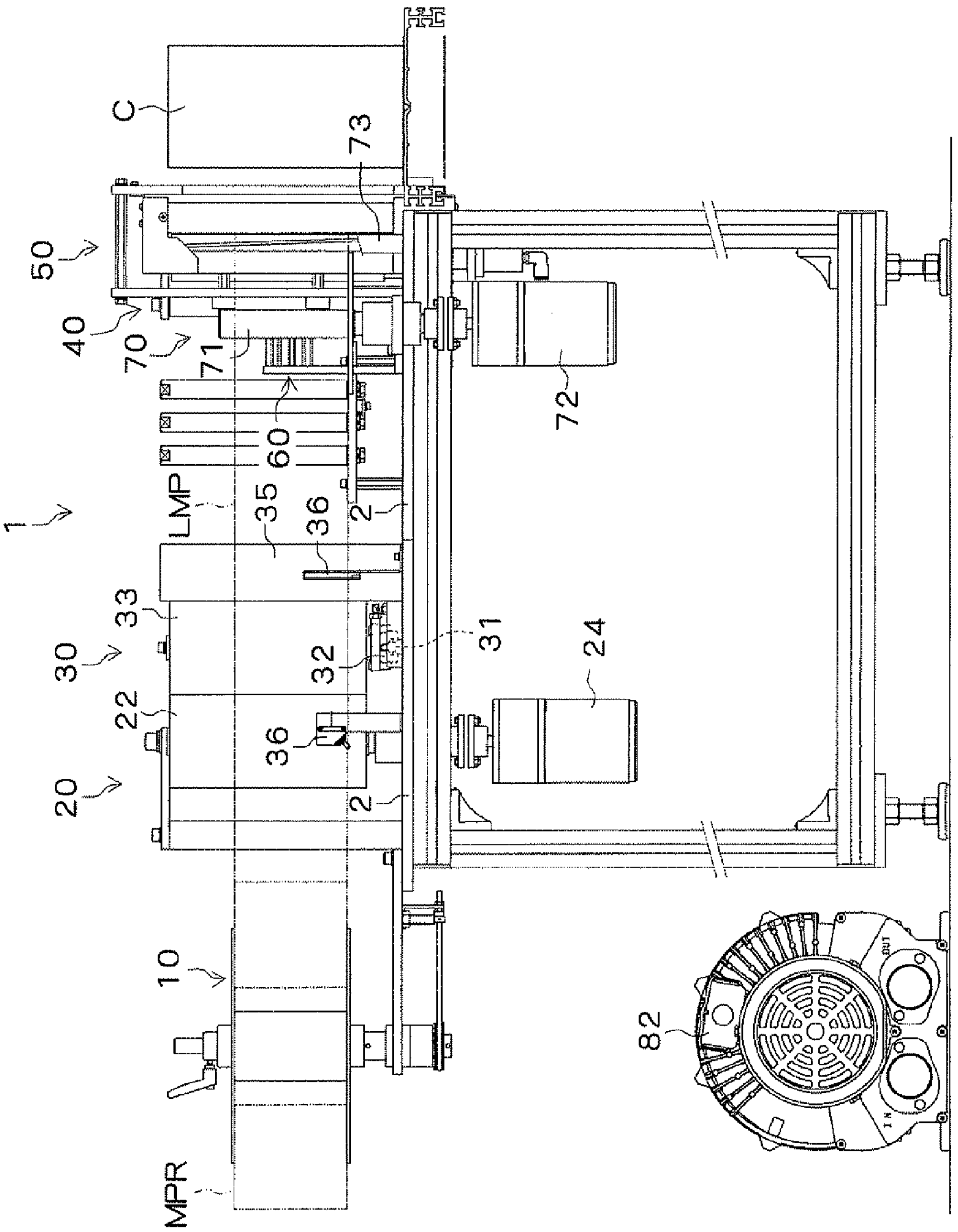
FIG. 2 is a side view showing the same above tack labeler.
Figure 3:
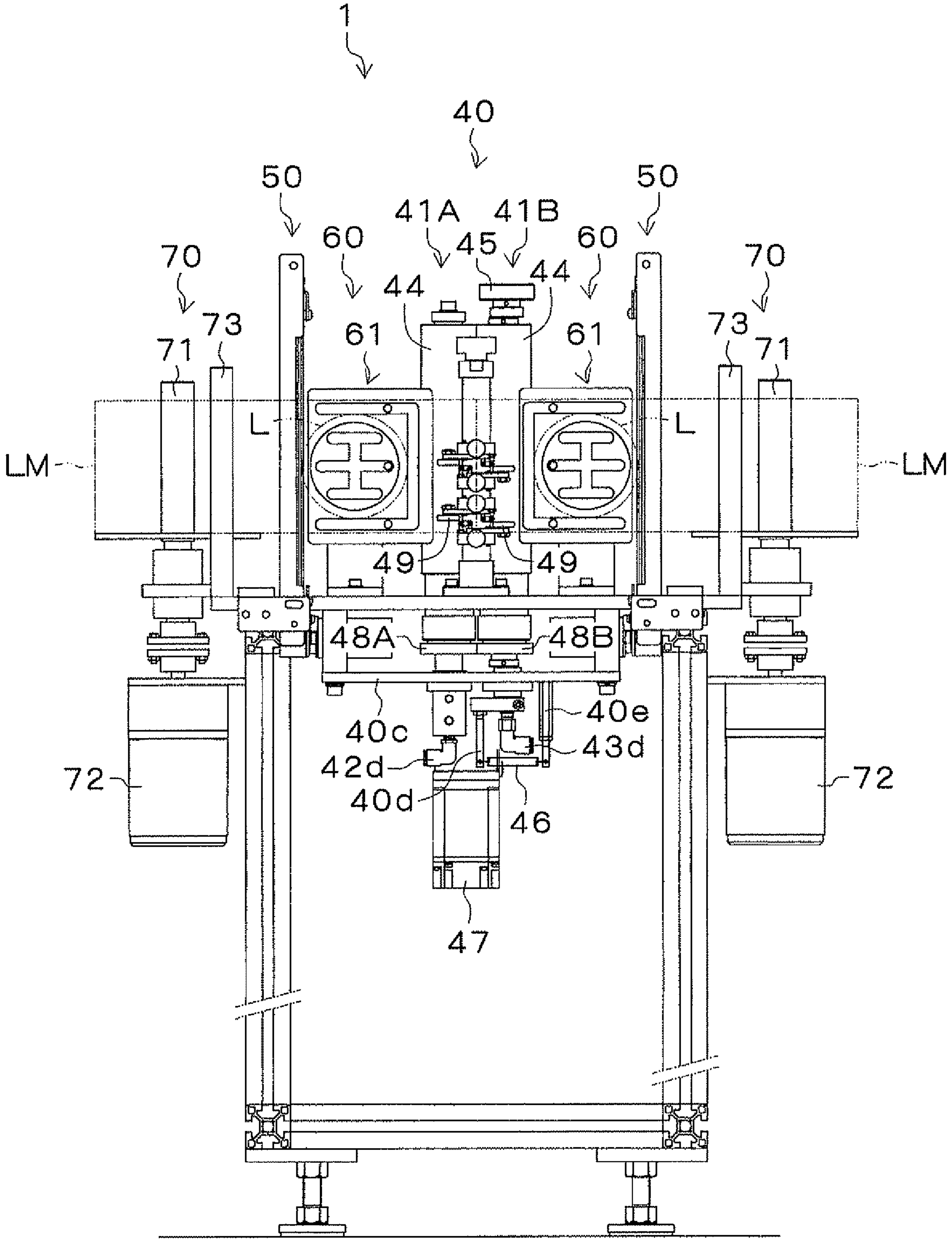
FIG. 3 is a front view showing the same above tack labeler.
Figure 9:
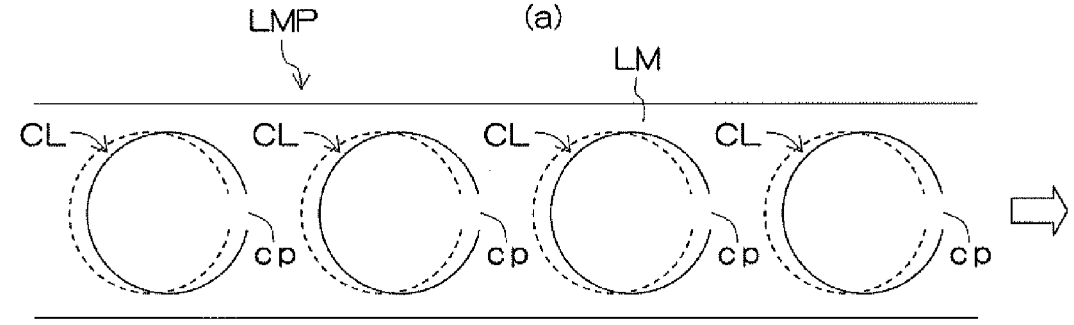
In FIG. 9, (a) is a plan view of one of the surfaces of a label formation base material pair used in the same above tack labeler, and (b) is a plan view of the other surface of the same above label formation base material pair.
Figure 9:
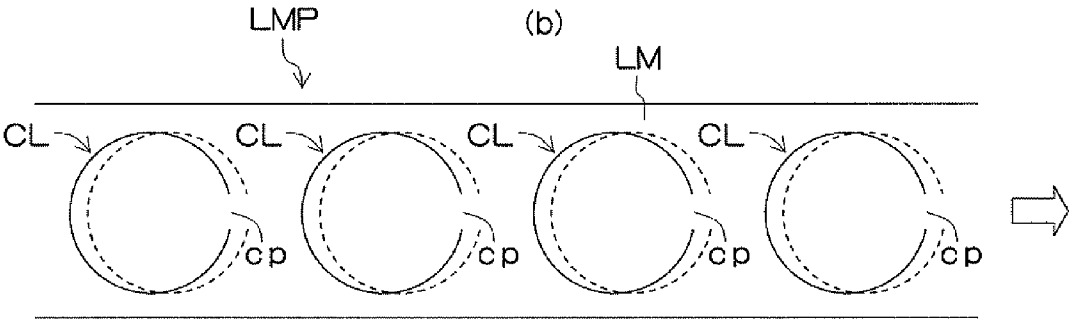

FIGS. 1 through 3 show a tack labeler 1. As shown in FIG. 9 (*a*) and (*b*), long strip-like label formation base materials LM, from which tack labels having a predetermined shape are to be cut, are detachably adhered to each other on respective adherence surface sides to form a label formation base material pair LMP. Cut lines CL, which have the shape of the tack labels having connection portions cp that are uncut at one part thereof and that are located at one end side of the tack labels in a longitudinal direction thereof, are successively formed on each of the label formation base materials LM with a predetermined interval in the longitudinal direction. In the label formation base material pair LMP, cut lines CL formed on one of the label formation base materials LM and cut lines CL formed on the other label formation base material LM are shifted in position in the longitudinal direction of the label formation base materials LM so as not to match each other. The tack labeler 1 reels out the label formation base material pair LMP from a base material pair roll MPR that is formed by winding the label formation base material pair LMP in a roll shape, detaches the label formation base materials LM from each other, then successively cuts connection portions cp of the cut lines CL formed on each of the label formation base materials LM to form the tack labels, and adheres the tack labels onto trunk portions of cup-like containers C.

Figure 11:
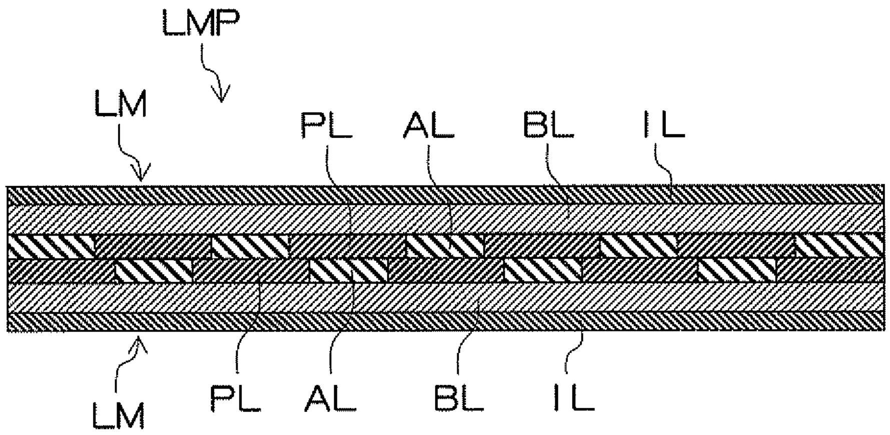
FIG. 11 is a cross-sectional view showing the same above label formation base material pair.
Figure 12:
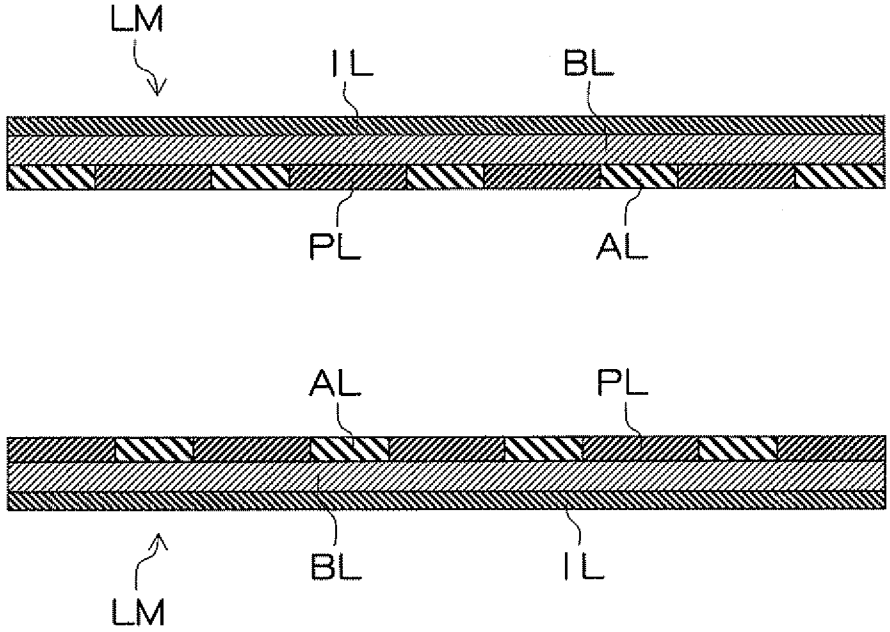
FIG. 12 is a cross-sectional view showing the label formation base material forming the same above label formation base material pair.

As shown in FIGS. 11 and 12, the label formation base materials LM include: a base material layer BL formed from plastic film, synthetic paper, or the like; an indicated print layer IL laminated on an external surface of the base material layer BL; adhesive layers AL formed from hot melt resin laminated on an internal surface of the base material layer BL; and non-adhesive layers PL formed from silicon resin. The adhesive layers AL and the non-adhesive layers PL are alternately arranged in the width direction of the base material layer BL. The label formation base materials LM included in the label formation base material pair LMP are adhered to each other. In this state, in order to prevent the adhesive layers AL of both of the label formation base materials LM from making contact with each other, the non-adhesive layers PL are arranged so as to be shifted from each other in the width direction.

As shown in FIGS. 1 through 3, the tack labeler 1 includes: a roll holder 10 for rotatably holding the base material pair roll MPR; a reeling-out unit 20 for reeling out the label formation base material pair LMP from the base material pair roll MPR set on the roll holder 10; a base material pair accumulation unit 30 for accumulating the label formation base material pair LMP reeled out by the reeling-out unit 20; a separating-delivering unit 40 for pulling out the label formation base material pair LMP from the base material pair accumulation unit 30, separating the label formation base material pair LMP into respective label formation base materials LM, and delivering the respective label formation base materials LM; cutting units 50 having a guillotine-type cutter for successively cutting the connection portions cp of the cut lines CL formed on each of the label formation base materials LM delivered by the separating-delivering unit 40 to form individual tack labels L; adhering units 60 for adhering the tack labels L cut off from each of the label formation base materials LM onto containers C conveyed to adherence positions; base material collecting units 70 for winding up and collecting each of the label formation base materials LM from which the tack labels have been cut off; a main control unit which is not illustrated and which is for collectively controlling actions of each of the units; and a sub control unit which is not illustrated and which controls delivering actions of the label formation base material pair LMP by the separating-delivering unit 40 while cooperating with the main control unit. A mark sensor 81, which is for detecting a mark printed on a predetermined position corresponding to a tack label on the label formation base material pair LMP, is installed between the base material pair accumulation unit 30 and the separating-delivering unit 40.

As shown in FIGS. 1 and 2, the reeling-out unit 20 includes: a reeling-out nip roller 21 including a driving roller 22 and a follower roller 23 that are provided so as to stand on a base plate 2; a geared motor 24 for rotating the driving roller 22 of the reeling-out nip roller 21; and a guide roller 25 interposed between the reeling-out nip roller 21 and the base material pair roll MPR set on the roll holder 10. When the driving roller 22 is rotated by the geared motor 24 in a state where the label formation base material pair LMP is nipped by the driving roller 22 and the follower roller 23, the label formation base material pair LMP is reeled out from the base material pair roll MPR set on the roll holder 10.

As shown in FIGS. 1 and 2, the base material pair accumulation unit 30 includes: a slide base 31 that is installed on a side opposite to the follower roller 23 with regard to the driving roller 22 of the reeling-out unit 20, and that extends in the width direction of the base plate 2; a slider 32 that moves along the slide base 31; a dancer roller 33 provided so as to stand on the slider 32 in a rotatable manner; a coil spring 34 biasing the slider 32 toward one end side (outer side in the width direction of the base plate 2) of the slide base 31; and a guide roller 35. The label formation base material pair LMP reeled out by the reeling-out nip roller 21 is alternately placed on the driving roller 22, the dancer roller 33, and the guide roller 35.

A roll detection sensor 36 including a transmissive-type photoelectric sensor for detecting the dancer roller 33 is installed beside the moving pathway of the dancer roller 33 at a middle part of the moving range of the dancer roller 33. When an accumulation amount of the label formation base material pair LMP becomes large, i.e., when the dancer roller 33 moves toward the outer side of the base plate 2 in the width direction, the dancer roller 33 is detected by the roll detection sensor 36. However, when the accumulation amount of the label formation base material pair LMP becomes small, i.e., when the dancer roller 33 moves toward the inner side of the base plate 2 in the width direction, the dancer roller 33 is not detected by the roll detection sensor 36.

The control units that are not illustrated conduct ON/OFF control of the geared motor 24 of the reeling-out unit 20, such that: while the dancer roller 33 is not detected by the roll detection sensor 36, i.e., while the accumulation amount of the label formation base material pair LMP is insufficient, the reeling-out action by the reeling-out unit 20 for the label formation base material pair LMP is executed; and when the dancer roller 33 is detected by the roll detection sensor 36, i.e., when the label formation base material pair LMP has accumulated sufficiently, the reeling-out action by the reeling-out unit 20 for the label formation base material pair LMP is stopped.

Figure 4:
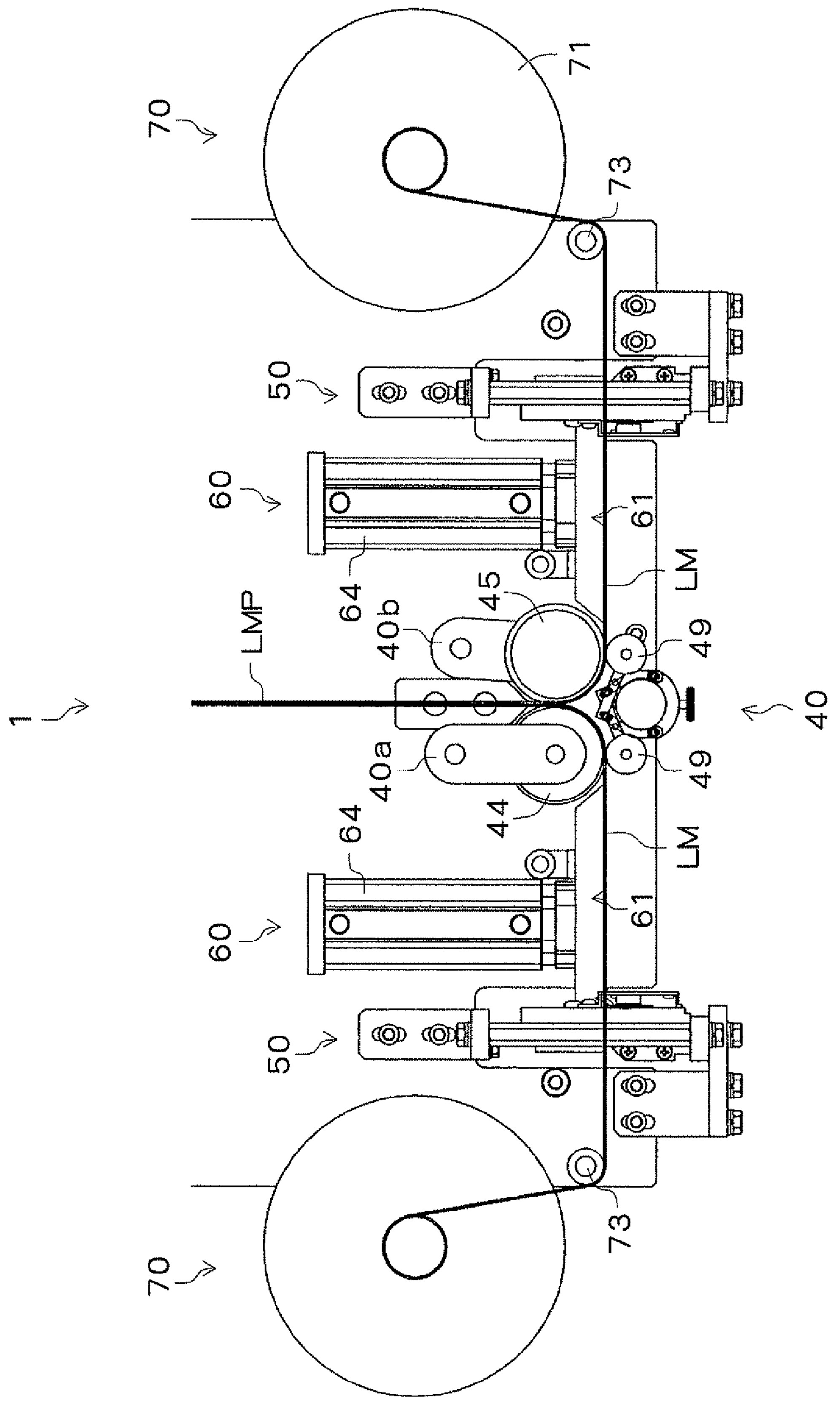
FIG. 4 is an enlarged plan view showing portions of the same above tack labeler, such as a separating-delivering unit, cutting units, adhering units, and base material collecting units.
Figure 5:
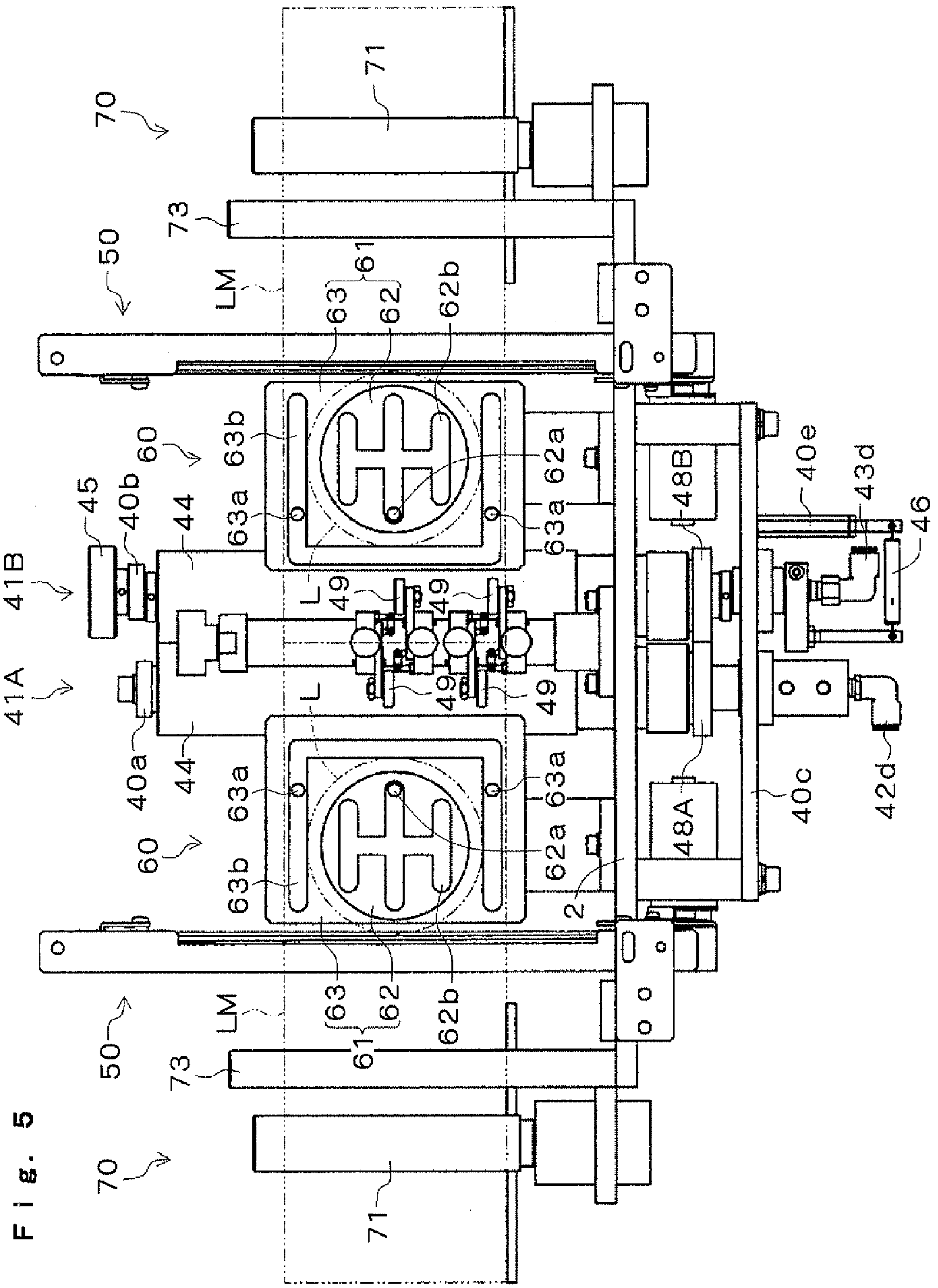
FIG. 5 is an enlarged front view showing portions of the same above tack labeler, such as the separating-delivering unit, the cutting units, the adhering units, and the base material collecting units.
Figure 6:
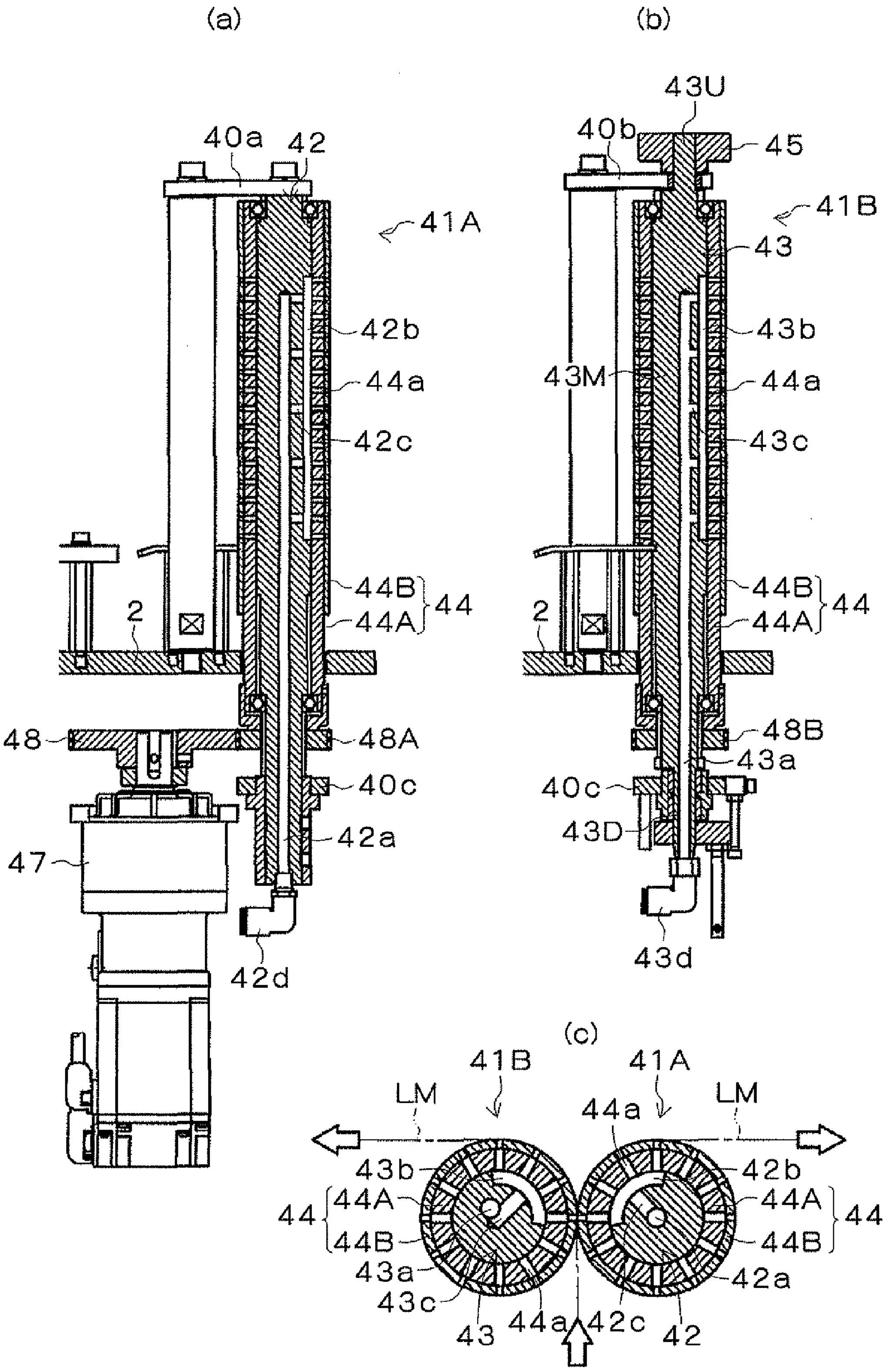
In FIG. 6, (a) is a vertical cross-sectional view showing one suction driving roller included in the separating-delivering unit mounted on the same above tack labeler, (b) is a vertical cross-sectional view showing the other suction driving roller included in the same above separating-delivering unit, and (c) is a horizontal cross-sectional view showing the suction driving rollers included in the same above separating-delivering unit.

As shown in FIGS. 4 through 6, the separating-delivering unit 40 includes: a pair of suction driving rollers 41A and 41B installed so as to nip the label formation base material pair LMP from both sides thereof and to penetrate the base plate 2; a servomotor 47 for rotating the suction driving roller 41A on one side; and auxiliary rollers 49 and 49 for nipping each of the label formation base materials LM between the rotating suction driving rollers 41A and 41B. Two sheets of the label formation base materials LM are continuously separated from the label formation base material pair LMP by delivering the separated label formation base materials LM in directions separating away from each other while having the label formation base materials LM follow along the outer peripheral surfaces of the pair of suction driving rollers 41A and 41B.

As shown in FIG. 4, and FIG. 6 (*a*) and (*c*), the suction driving roller 41A on one side includes a central shaft 42 penetrating the base plate 2; and a roller tube 44 that is rotatably supported by the central shaft 42 via a bearing and that has numerous suction holes 44*a* each of which opens to the inner peripheral surface side at one end and opens to the outer peripheral surface side at the other end. The top end of the central shaft 42 is fixed by one end of a support piece 40*a* whose other end is supported by a support rod provided so as to stand on the base plate 2 above the base plate 2, and the bottom end of the central shaft 42 is fixed to a flat bar 40*c* whose respective ends are attached to the base plate 2 via a support rod below the base plate 2.

As shown in FIG. 6 (*a*), the central shaft 42 includes: a main suction passage 42*a* that extends in the vertical direction through the central part of the central shaft 42 and whose top end is blocked; a recessed portion 42*b* formed at a portion, from a position at which the roller tubes 44 and 44 of the pair of the suction driving roller 41A and 41B are located closest to each other on the outer peripheral surface, to a position located 90 degrees away from said position in the delivering direction of the label formation base materials LM; and five communication passages 42*c* that allow communication between the main suction passage 42*a* and the recessed portion 42*b* and that are arranged one above another. A connection elbow 42*d* for a suction tube for connecting to a suction blower 82 via a pressure regulating valve is attached at an open bottom end of the main suction passage 42*a*.

As shown in FIG. 4, and FIG. 6 (*b*) and (*c*), the suction driving roller 41B on the other side also includes: a central shaft 43 penetrating the base plate 2; and the roller tube 44 that is rotatably supported by the central shaft 43 via a bearing and that has numerous suction holes 44*a* each of which opens to the inner peripheral surface side at one end and opens to the outer peripheral surface side at the other end. However, the top end of the central shaft 43 is rotatably supported by one end of a support piece 40*b* whose other end is supported by a support rod provided so as to stand on the base plate 2 above the base plate 2, and the bottom end of the central shaft 43 is rotatably support by the flat bar 40*c* below the base plate 2.

As shown in FIG. 3 and FIG. 6 (*b*), the central shaft 43 includes: a lower shaft 43D rotatably supported by the flat bar 40*c*; a middle shaft 43M installed continuously to the lower shaft 43D in a state of being eccentric with regard to a rotation center of the lower shaft 43D; an upper shaft 430 installed continuously to the middle shaft 43M such that the rotation center of the upper shaft 43U matches the rotation center of the lower shaft 43D; a knob 45 fixed on the upper shaft 430; and a coil spring 46 having one end thereof coupled to the support member 40*d* attached to the lower shaft 43D and the other end coupled to a support member 40*e* attached to the flat bar 40*c*. By rotating the knob 45, the roller tube 44 rotatably supported by the middle shaft 43M is brought close to and away from the roller tube 44 of the suction driving roller 41A on one side. In addition, the middle shaft 43M (roller tube 44) is constantly biased by the coil spring 46 in a direction toward the roller tube 44 of the suction driving roller 41A on the other side. Therefore, when setting the label formation base material pair LMP, the label formation base material pair LMP is nipped between the roller tubes 44 and 44 of the pair of suction driving rollers 41A and 41B, by rotating the knob 45 to separate the roller tube 44 of the suction driving roller 41B on one side from the roller tube 44 of the suction driving roller 41A on the other side, inserting the label formation base material pair LMP between the roller tubes 44 and 44, and then releasing the knob 45 to have the roller tube 44 of the suction driving roller 41B on the other side restored to an original position thereof through a bias force of the coil spring 46.

In addition, similar to the central shaft 42 of the suction driving roller 41A, the central shaft 43 of the suction driving roller 41B on one side includes: a main suction passage 43*a* that extends in the vertical direction through the central part of the central shaft 43 and whose top end is blocked; a recessed portion 43*b* formed at a portion, from a position at which the roller tubes 44 and 44 of the pair of the suction driving rollers 41A and 41B are located closest to each other on the outer peripheral surface of the middle shaft 43M, to a position located 90 degrees away from said position in the delivering direction of label formation base materials LM; five communication passages 43*c* that allow communication between the main suction passage 43*a* and the recessed portion 43*b* and that are arranged one above another. A connection elbow 43*d* for a suction tube for connecting to the suction blower 82 via a pressure regulating valve is attached at an open bottom end of the main suction passage 43*a*.

The roller tube 44 that is a part of each of the suction driving rollers 41A and 41B includes: a main body portion 44A formed from aluminum; and a cover portion 44B formed from urethane rubber for covering the outer peripheral surface of the main body portion 44A in order to prevent sliding of the label formation base material pair LMP that is to be nipped and delivered and sliding of the two sheets of the label formation base materials LM obtained through separation of the label formation base material pair LMP. The suction holes 44*a* are formed on both the main body portion 44A and the cover portion 44B.

Furthermore, gears 48A and 48B, which are meshed to each other and which rotate together with the respective roller tubes 44 and 44, are attached to the pair of the suction driving rollers 41A and 41B. Since the gear 48A of the suction driving roller 41A on one side is meshed together with a gear attached to a drive shaft of the servomotor 47, a rotational driving force of the servomotor 47 is transferred to the pair of the suction driving rollers 41A and 41B, and thereby enables the pair of the suction driving rollers 41A and 41B to rotate in opposite directions.

Figure 7:
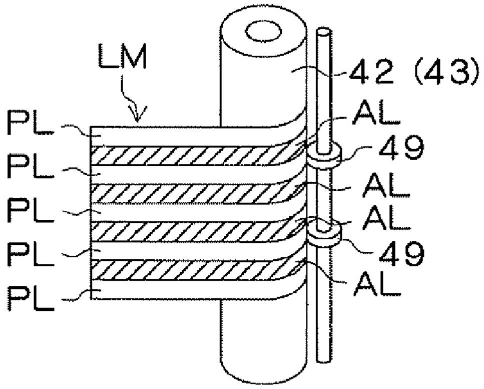
FIG. 7 is a diagram for explaining an auxiliary roller included in the separating-delivering unit of the same above tack labeler.
Figure 8:
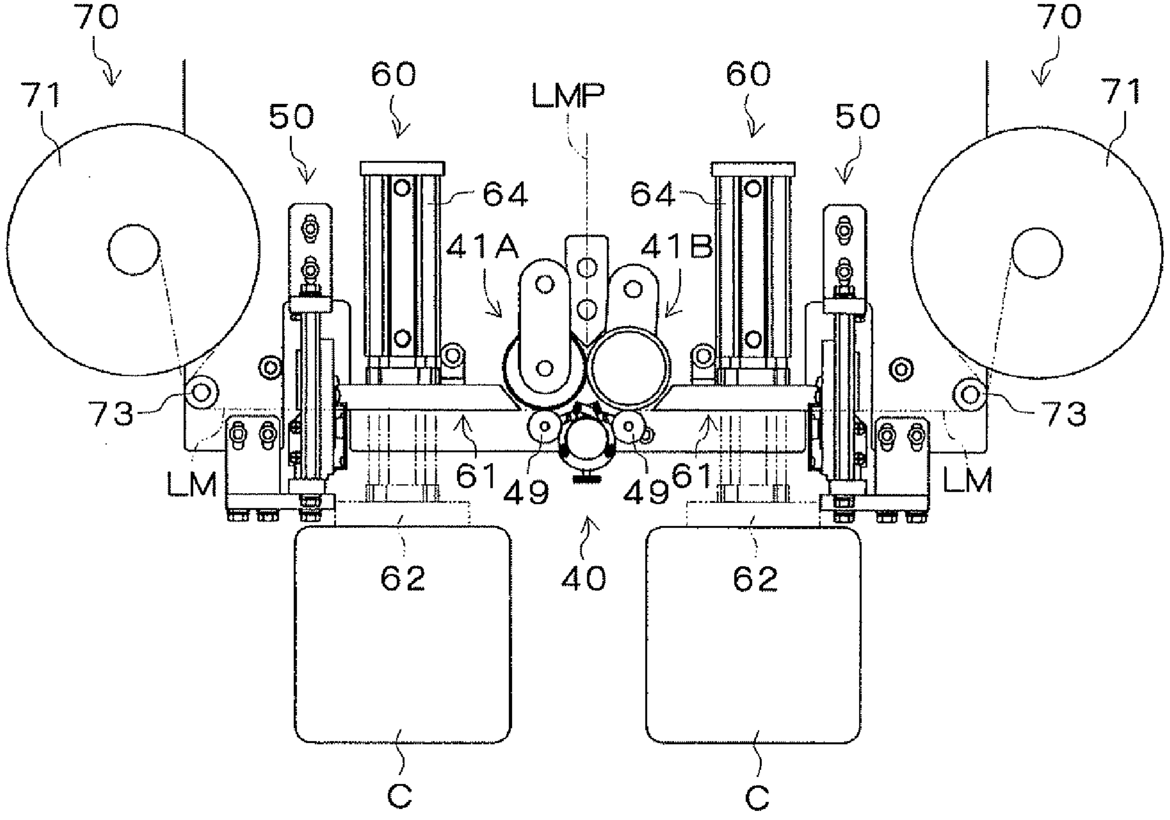
FIG. 8 is a plan view showing a state at the time of adherence for portions of the same above tack labeler, such as the separating-delivering unit, the cutting units, the adhering units, and the base material collecting units.

The auxiliary rollers 49, which make contact with the adherence surface side of label formation base materials LM, are arranged at two height levels to allow adjusting of height positions, have a disc shape whose height is smaller than the width of the non-adhesive layers PL in label formation base materials LM as shown in FIG. 3, and are installed at height positions corresponding to the non-adhesive layers PL in order to avoid making contact with the adhesive layers AL on the adherence surfaces of the label formation base materials LM as shown in FIG. 7. Therefore, an adhesive forming the adhesive layers AL will not stick to the auxiliary rollers 49, and thereby label formation base materials LM can be delivered smoothly.

A so-called pitch control is conducted on the separating-delivering unit 40 by the sub control unit in cooperation with the main control unit for intermittently delivering a predetermined amount of the label formation base material pair LMP. After the mark sensor 81 detects the mark printed on the label formation base material pair LMP, the separating-delivering unit 40 delivers the label formation base material pair LMP for the predetermined amount that is determined in advance, such that the connection portions formed on the separated label formation base materials LM are moved to a cut position of the cutting units 50.

Figure 10:
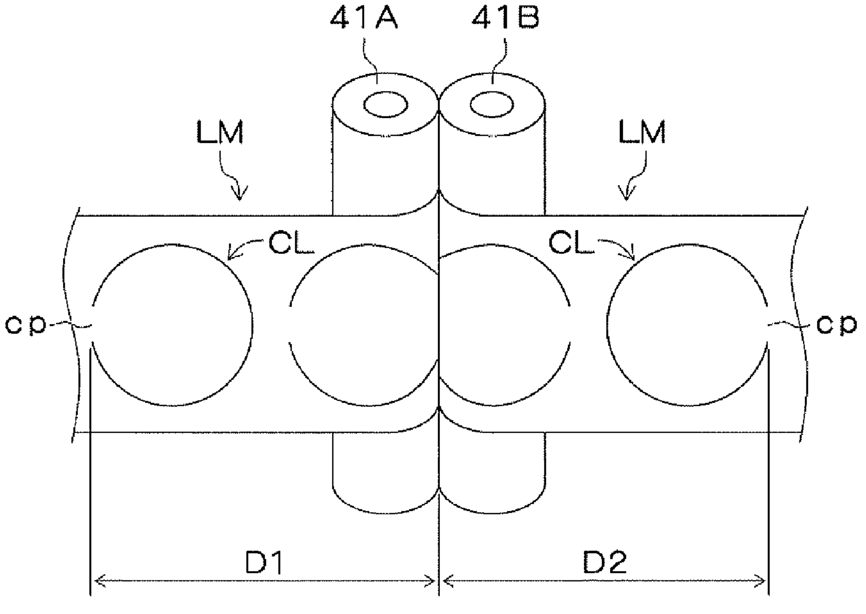
FIG. 10 is a perspective view showing label formation base materials of the same above label formation base material pair when the label formation base materials are being separated.

As described above, in the label formation base material pair LMP, since the label formation base materials LM are shifted in position from each other in the longitudinal direction thereof such that the cut lines CL formed on one of the label formation base materials LM and the cut lines CL formed on the other label formation base material LM do not match each other, a distance D1 from a separation position of the label formation base material LM to a stop position of a connection portion cp in a cut line CL of one of the label formation base materials LM differs from a distance D2 from the separation position of the label formation base material LM to a stop position of a connection portion cp in a cut line CL of the other label formation base material LM as shown in FIG. 10, even when the separating-delivering unit 40 separates and delivers the mutually adhered label formation base materials LM for the predetermined amount. Therefore, the cutting units 50 that successively cut the connection portions cp of the cut lines CL formed on each of the separated label formation base materials LM are installed so as to be also shifted in position from one another, in accordance with the stop positions of the connection portions cp of the cut lines CL of each of the label formation base materials LM.

As shown in FIGS. 4 and 5, the adhering units 60 include: generally rectangular-shaped suction plates 61 that are divided into circular movable portions 62 which are slightly smaller than the tack labels L and fixing portions 63 located outward of the movable portions 62, and that suction and hold each of the label formation base materials LM separated and delivered by the separating-delivering unit 40 for the predetermined amount; and drive cylinders 64 for moving the movable portions 62 of the suction plates 61 forward and backward.

On each of the movable portions 62 of the suction plates 61, a single suction hole 62*a* is formed on a suctioning-holding surface of the movable portion 62, and a comb-shaped suction groove 62*b* that communicates with the suction hole 62*a* is formed. On each of the fixing portions 63 of the suction plates 61, two suction holes 63*a* and 63*a* are formed on a suctioning-holding surface of the fixing portion 63, and a suction groove 63*b* that communicates with the two suction holes 63*a* and 63*a* are formed so as to surround the circular movable portion 62.

The suction plates 61 are installed between the respective cutting units 50 and 50 and the respective suction driving rollers 41A and 41B of the separating-delivering unit 40 so as to be adjacent to both. The suction plate 61 installed on a side of the cutting unit 50 distal to the separation position of the label formation base materials LM is formed wider than the suction plate 61 installed on a side of the other cutting unit 50.

The outer peripheral edge of each of the movable portions 62 of the suction plates 61 is arranged such that an end edge on the side of the cutting unit 50 in the fixing portion 63 matches the outer peripheral edge of the movable portions 62. Thus, when a connection portion cp in a cut line CL formed on the label formation base material LM reaches the cut position, each of the movable portions 62 will be located inside the portion that is enclosed by the cut line CL formed on each of the label formation base materials LM so as to be a tack label L.

In addition, each of the suction holes 62*a* and 63*a* of the suction plates 61 is connected to the suction blower 82 via a vacuum valve (not illustrated) that uses air as a drive source, and as described in the following, suctioning action by the suction plates 61 is intermittently conducted by having the control unit, which is not illustrated, operate an air valve 83 for opening and closing the vacuum valve through a control of the supply of air for driving the vacuum valve.

When each of the separated label formation base materials LM is delivered for the predetermined amount and is stopped, the suctioning action by the suction plates 61 is initiated and the label formation base material LM is held by the suction plates 61. At this moment, each of the movable portions 62 of the suction plates 61 is located inside the portion that is enclosed by the cut line CL formed on each of the label formation base materials LM so as to be the tack label L.

Here, when the cutting units 50 cut the connection portions cp of the cut lines CL formed on each of the label formation base materials LM, the tack labels L are cut off from each of the label formation base materials LM, and the tack labels L that have been cut off are suctioned and held only by the movable portions 62 of the suction plates 61. Subsequently, the movable portions 62 that have suctioned and held the tack labels L advance, and the tack labels L are adhered to trunk portions of containers C conveyed to adherence positions by container conveyance units. Then, the suctioning action by the suction plates 61 is stopped, and the suction plates 61 retreat to initial positions.

As shown in FIGS. 4 and 5, the base material collecting units 70 include: wind-up reels 71 that are supported by the base plate 2 via bearings, and that wind up the label formation base materials LM from which the tack labels L have been cut off by the cutting units 50; geared motors 72 for rotating the wind-up reels 71; and guide rollers 73 provided so as to stand on the base plate 2. The geared motors 72 conduct a constant-torque control for holding a constant torque by using a cycle-converting inverter. Therefore, the wind-up reels 71 will not rotate when the delivering of the label formation base materials LM by the separating-delivering unit 40 is stopped; however, when the delivering of the label formation base materials LM by the separating-delivering unit 40 is initiated, the wind-up reels 71 rotate to wind up the label formation base materials LM from which the tack labels L have been cut off.

With the tack labeler 1 as configured as described above, the respective label formation base materials LM adhered to each other are separated when the suction driving rollers 41A and 41B are rotated in a state where a leading end of the label formation base material pair LMP delivered from the reeling-out unit 20 is split to follow along the outer peripheral surfaces of the suction driving rollers 41A and 41B of the separating-delivering unit 40. At this moment, since the connection portions cp of the cut lines CL formed on each of the label formation base materials LM are located on the downstream side of the delivering direction of the label formation base materials LM, the portions that are enclosed by the cut lines CL and that are to be tack labels are also separated with certainty due to the connection portions cp. Then, by successively cutting the connection portions cp formed on each of the separated label formation base materials LM by the cutting units 50, the individual tack labels L are formed, and then, the tack labels L are adhered onto the containers C by the adhering units 60 with certainty.

Furthermore, on the label formation base material pair LMP, the cut lines CL formed on one of the label formation base materials LM and the cut lines CL formed on the other label formation base material LM are shifted in position in the longitudinal direction of the label formation base materials LM so as not to match each other. Therefore, as shown in FIG. 9, the portions enclosed by the cut lines CL formed on one of the label formation base materials LM so as to be tack labels are adhered and held outside the portions enclosed by the cut lines CL formed on the other label formation base material LM so as to be tack labels. Thus, portions enclosed by the cut lines CL formed on both of the label formation base materials LM so as to be tack labels do not become loose, and thereby the label formation base material pair LMP can be reeled out and delivered smoothly with certainty.

Figure 13:
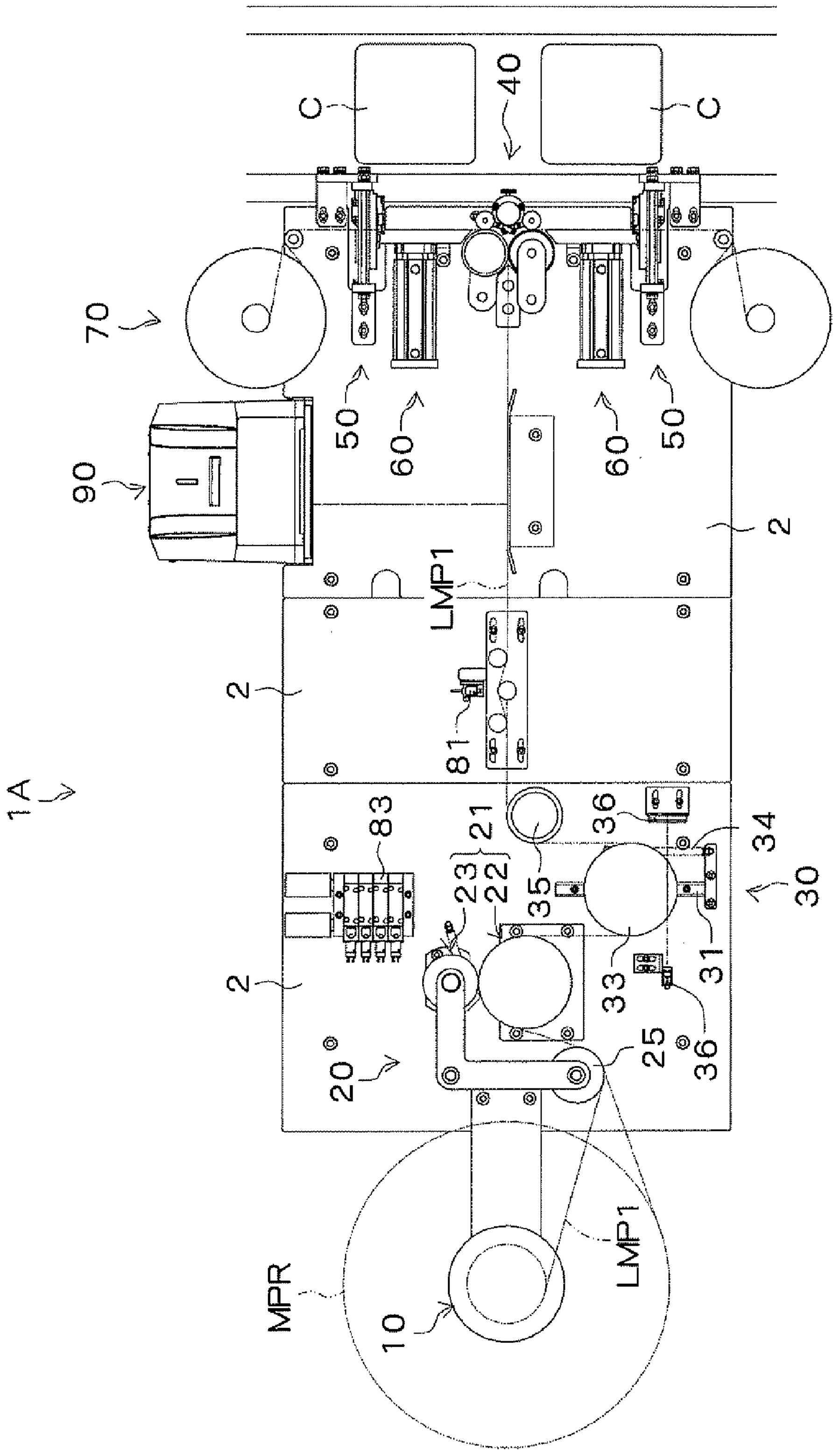
FIG. 13 is a plan view showing a tack labeler which is another embodiment.
Figure 14:
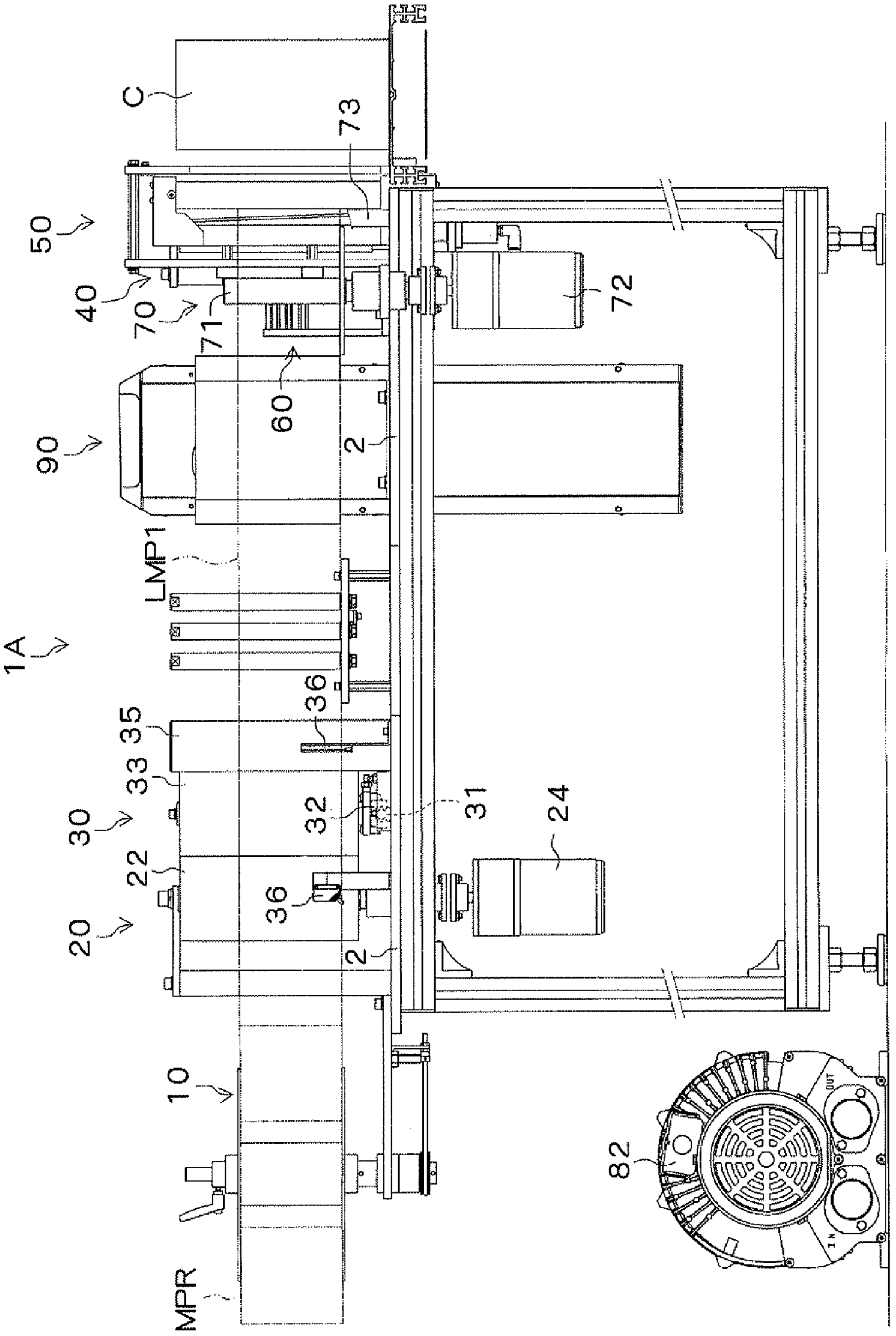
FIG. 14 is a side view showing the same above tack labeler.
Figure 15:
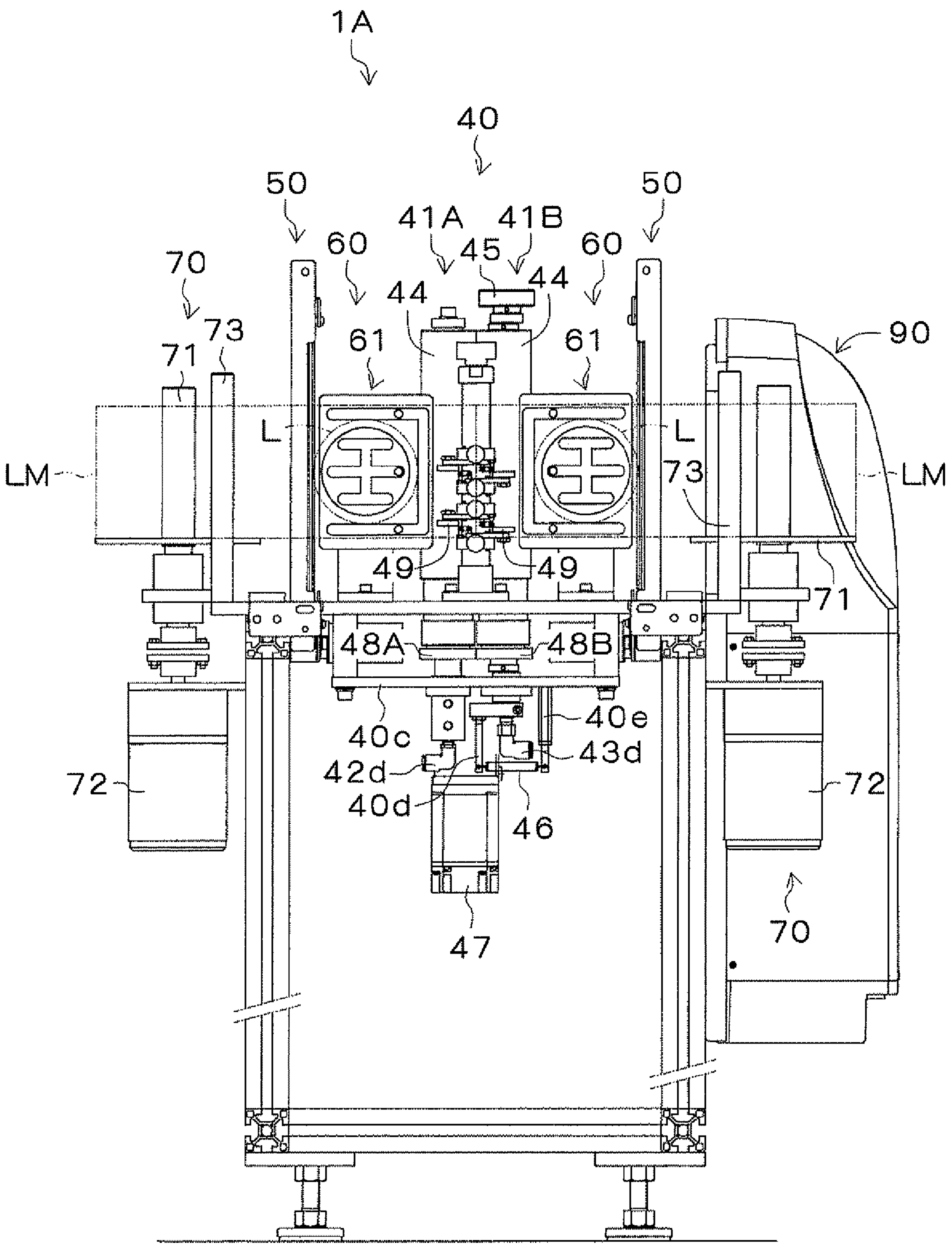
FIG. 15 is a front view showing the same above tack labeler.

Another embodiment is shown in FIGS. 13 through 15. A tack labeler 1A here has basically the same configuration as that of the above described tack labeler 1, and thereby the same reference characters are given to the same components and descriptions of those are omitted, and different components will be described in detail.

Used for the above described the tack labeler 1 are the label formation base material pair LMP having formed thereon in advance the cut lines CL with the shape of the tack labels having the connection portions cp that are uncut at one part thereof and that are located at one end side of the tack labels in the longitudinal direction of the label formation base materials LM which are detachably adhered to each other. However, the tack labeler 1A uses a label formation base material pair LMP1 obtained by simply detachably adhering long strip-like label formation base materials LM on adherence surface sides thereof, and the tack labeler 1A forms the tack label-shaped cut lines CL on the label formation base materials LM forming the label formation base material pair LMP1. Therefore, a laser cutter 90 is mounted on the tack labeler 1A, and forms, on the label formation base material pair LMP1 and at a location between the base material pair accumulation unit 30 and the separating-delivering unit 40, the cut lines CL with the shape of the tack labels having the connection portions cp that are uncut at one part thereof and that are located at the downstream side of the delivering direction.

Figure 16:
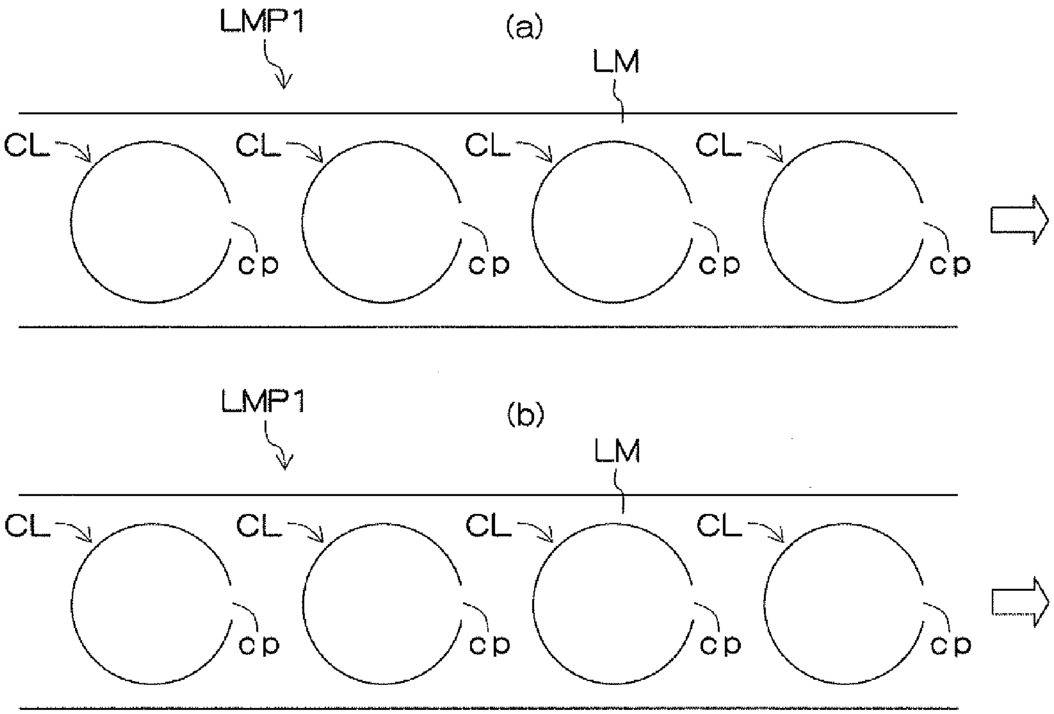
In FIG. 16, (a) is a plan view of one of the surfaces of the same above label formation base material pair on which cut lines have been formed, and (b) is a plan view of the other surface of the same above label formation base material pair.

With the tack labeler 1A, the label formation base materials LM, on which the cut lines CL are to be formed by the laser cutter 90, are separated by the separating-delivering unit 40 immediately after the cut lines CL are formed. Therefore, with regard to the cut lines CL formed on the label formation base material pair LMP1, it is not necessary to shift the positions of the cut lines CL formed on one of the label formation base materials LM from the positions of the cut lines CL formed on the other label formation base material LM in the longitudinal direction of the label formation base materials LM so as not to match each other as in the case with the label formation base material pair LMP used in the above described tack labeler 1. Thus, the cut lines CL of the label formation base material pair LMP1 may be formed such that the cut lines CL formed on both label formation base materials LM match each other (cf., FIG. 16 (*a*) and (*b*)).

Figure 17:
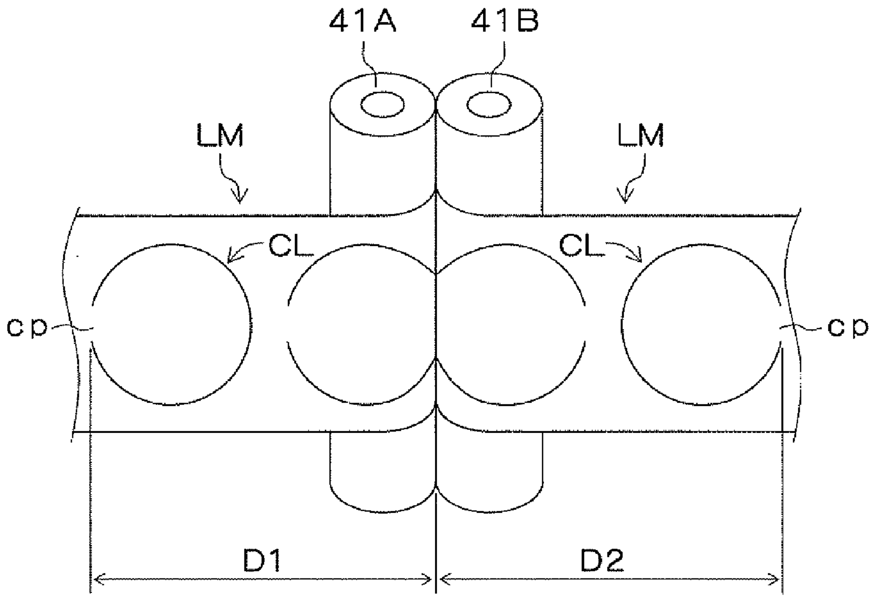
FIG. 17 is a perspective view showing the label formation base material of the same above label formation base material pair when the label formation base material is being separated.
Figure 18:
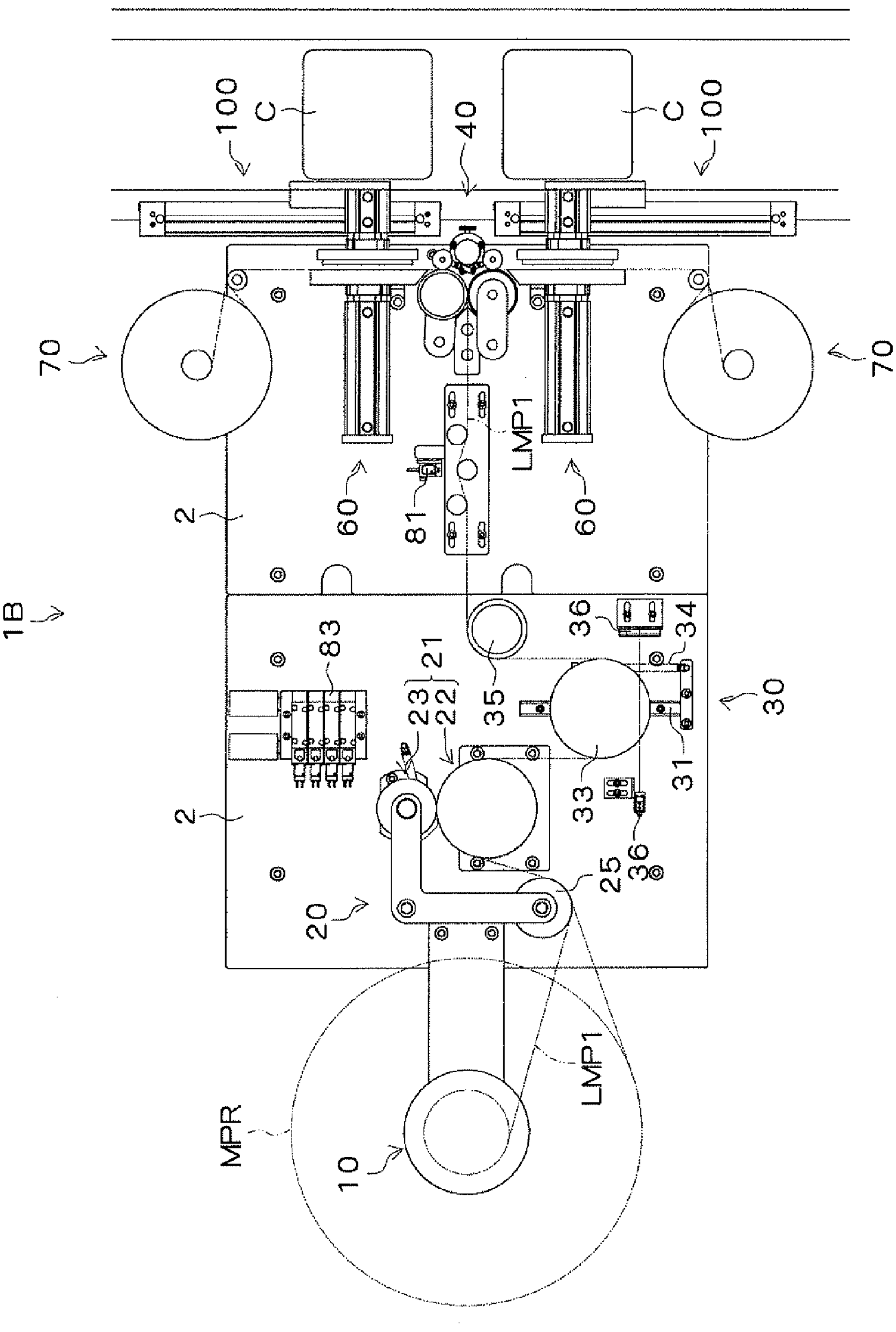
FIG. 18 is a plan view showing a tack labeler which is another embodiment.

Furthermore, since the cut lines CL formed on one of the label formation base materials LM and the cut lines CL formed on the other label formation base material LM are not shifted in position in the longitudinal direction of the label formation base materials LM, a distance D1 from a separation position of the label formation base materials LM to a stop position of the connection portion cp in the cut line CL of one of the label formation base materials LM matches a distance D2 from the separation position of the label formation base materials LM to a stop position of a connection portion cp in the cut lines CL of the other label formation base material LM, as shown in FIG. 17. Thus in the tack labeler 1A, one pair of the cutting units 50 are installed at positions equally distant from the separation position of the label formation base materials LM, and one pair of the suction plates 61 of the adhering units 60 are also set to have identical widths.

It should be noted that, although the laser cutter 90 is used as the cut-line forming means for forming the cut lines CL on the label formation base material pair LMP1 in the tack labeler 1A, the present invention is not limited thereto; and the cut lines CL may be formed on the label formation base material pair LMP1 by pressing the label formation base material pair LMP1 using a punch-out mold having a blade with a similar cut line shape.

Furthermore, the cut lines CL may be formed on the label formation base material pair LMP1 when separating the label formation base material pair LMP1 into two sheets of the label formation base materials LM, by providing a function as the cut-line forming means such as a die roll or an anvil roll on the separating-delivering rollers such as the suction driving rollers 41A and 41B included in the separating-delivering unit 40.

Another embodiment is shown in FIGS. 18 through 23. A tack labeler 1B here also has basically the same configuration as that of the above described tack labeler 1, and thereby the same reference characters are given to the same components and descriptions of those are omitted, and different components will be described in detail.

With the above described tack labeler 1, the individual tack labels L are formed by cutting the connection portions cp by the cutting units 50, by using the label formation base material pair LMP having formed thereon in advance the cut lines CL with the shape of the tack labels having the connection portions cp that are uncut at one part thereof and that are located at one end side of the tack labels in the longitudinal direction of the label formation base materials LM which are detachably adhere to each other. However, the tack labeler 1B uses the label formation base material pair LMP1 obtained by simply detachably adhering the long strip-like label formation base materials LM on the adherence surface sides thereof; and the individual tack labels L are formed by separating the label formation base materials LM by the separating-delivering unit 40 and then punching out the label formation base materials LM as tack label shapes at adherence positions of the tack labels L. Thus, punch-out units 100 are installed on the tack labeler 1B instead of the cutting units 50 of the tack labeler 1.

Figure 19:
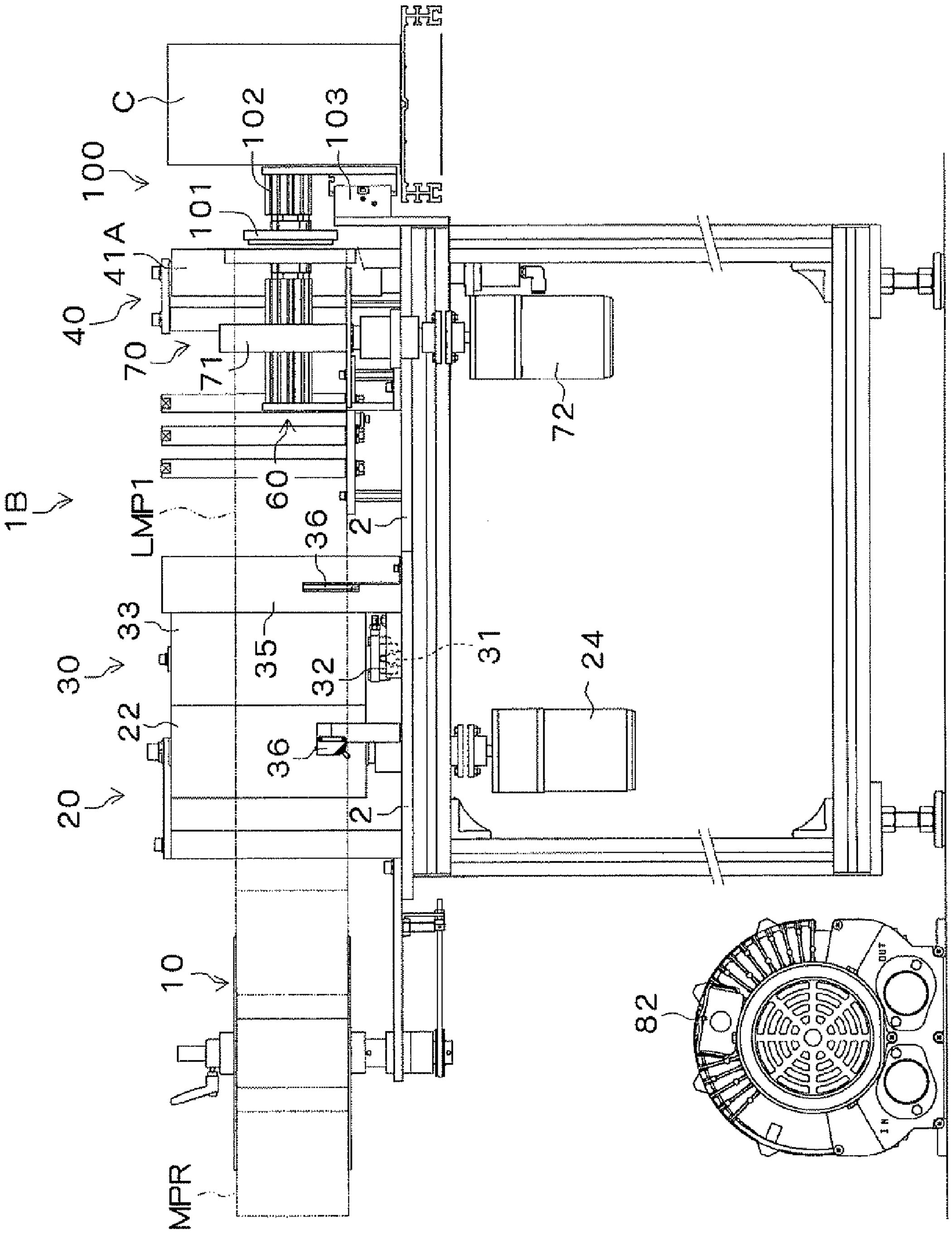
FIG. 19 is a side view showing the same above tack labeler.
Figure 20:
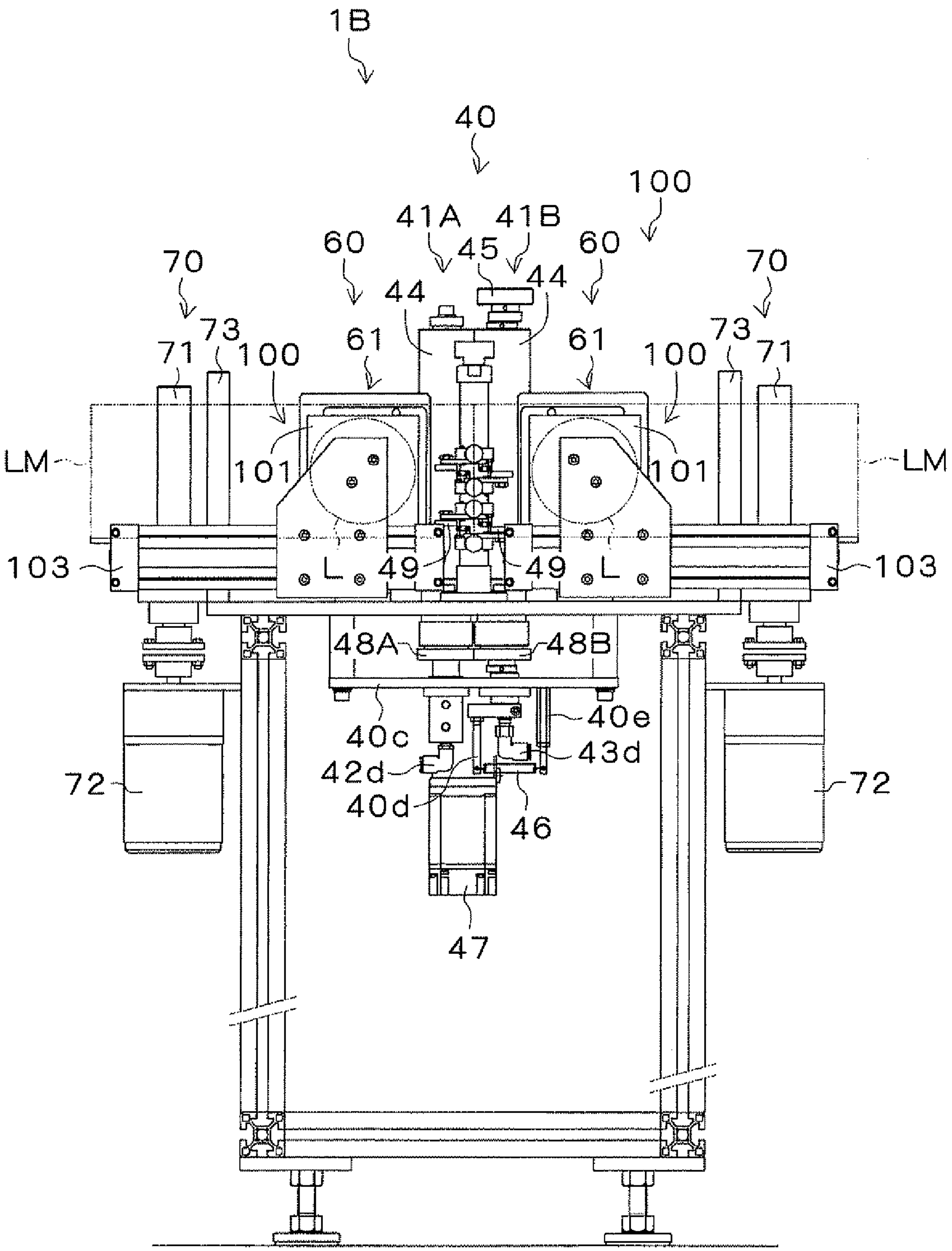
FIG. 20 is a front view showing the same above tack labeler.
Figure 21:
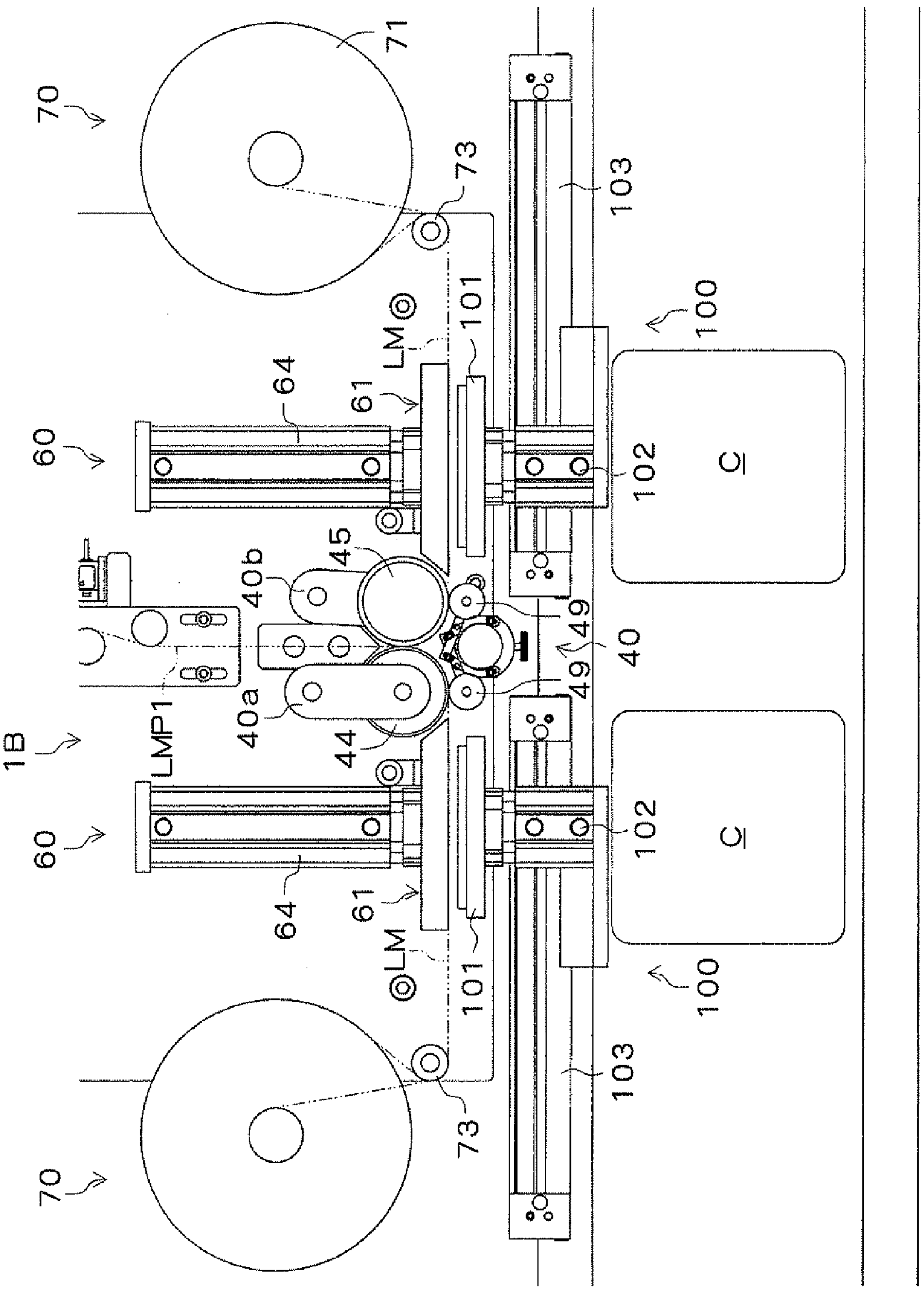
FIG. 21 is an enlarged plan view showing portions of the same above tack labeler, such as a separating-delivering unit, punch-out units, adhering units, and base material collecting units.

As shown in FIGS. 19 through 21, the punch-out units 100 include: punch-out molds 101 having formed thereon tack label-shaped punch-out blades; drive cylinders 102 for moving, such that suction surfaces of the movable portions 62 and the suction surfaces of the fixing portions 63 become the same plane, the punch-out molds 101 back and forth with regard to the suction plates 61 in the forward side of the suction plates 61 when the movable portions 62 are retreated; and drive cylinders 103, which work together with the drive cylinders 102, for moving the punch-out molds 101 back and forth between forward positions and side-retreat positions of the suction plates 61. In a state where the drive cylinders 102 and the punch-out molds 101 are retreated on the side, the movable portions 62 of the suction plates 61 can move to and from containers C stopped in the front.

Figure 22:
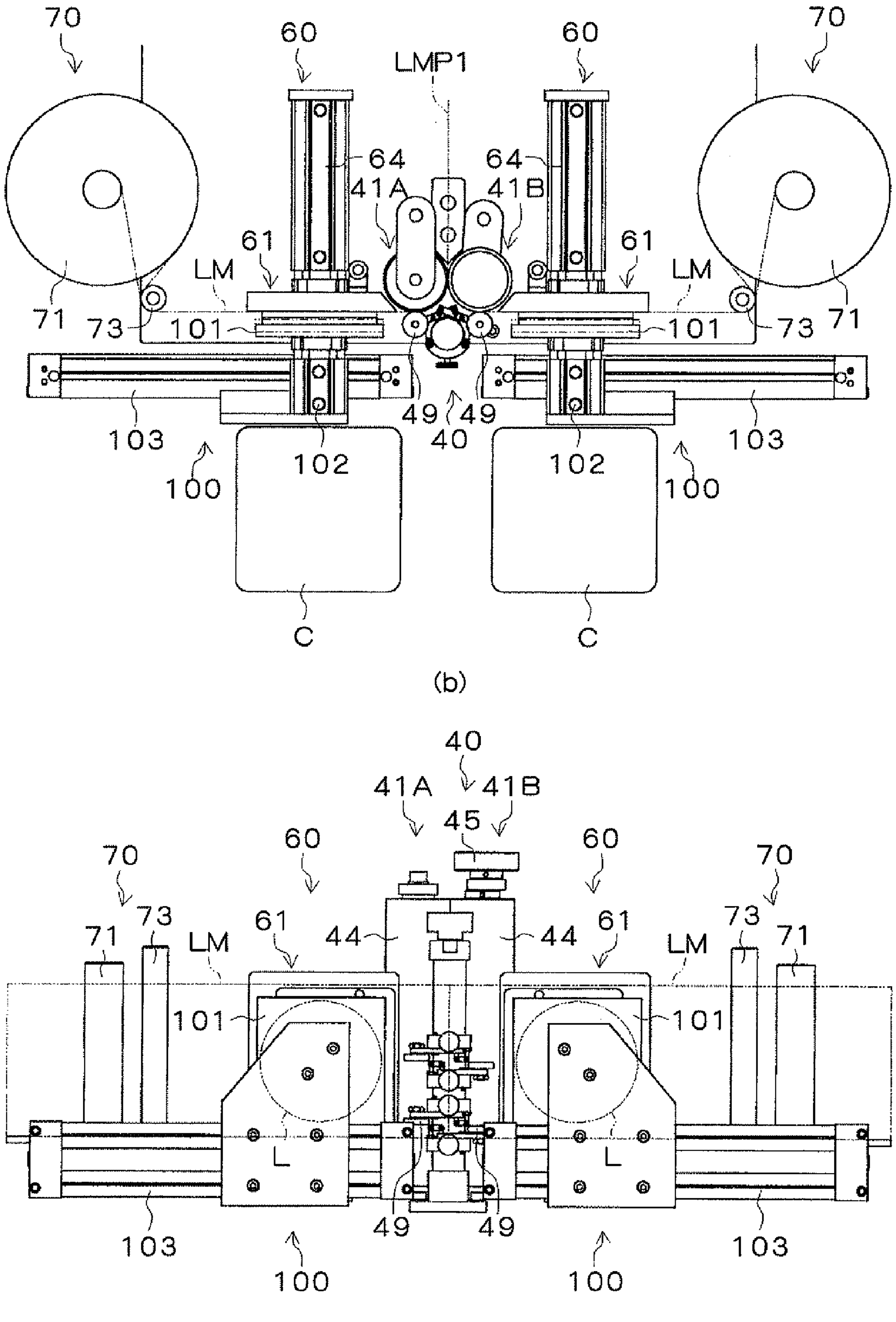
In FIG. 22, (a) and (b) are diagrams for explaining actions of the same above tack labeler.
Figure 23:
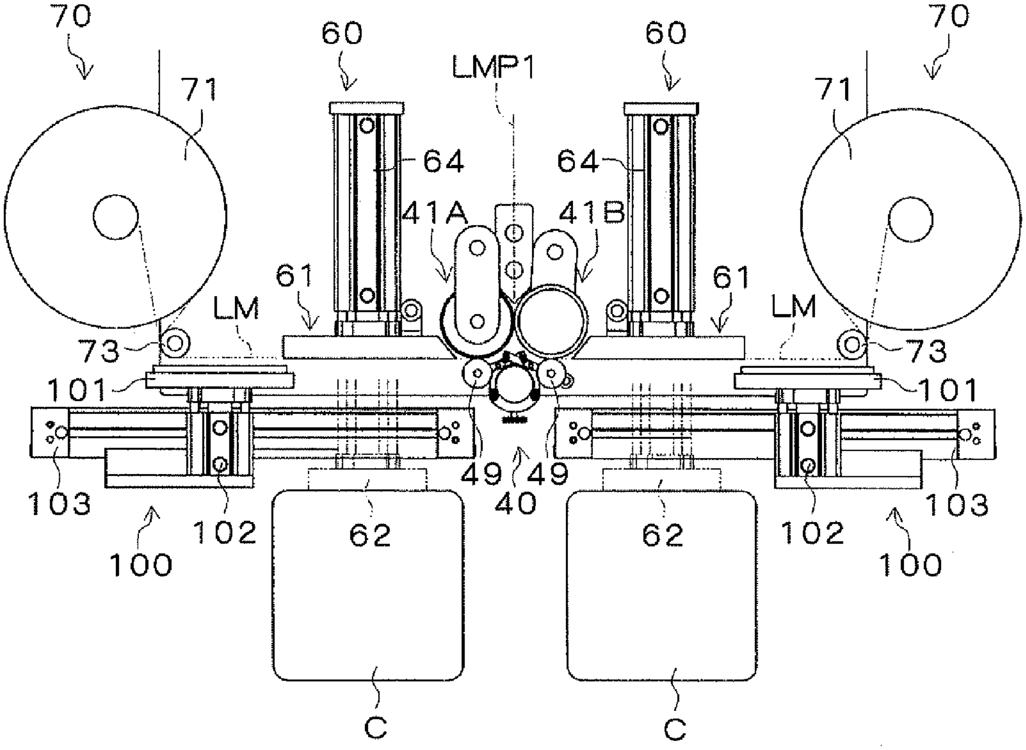
In FIG. 23, (a) and (b) are diagrams for explaining actions of the same above tack labeler.
Figure 23:
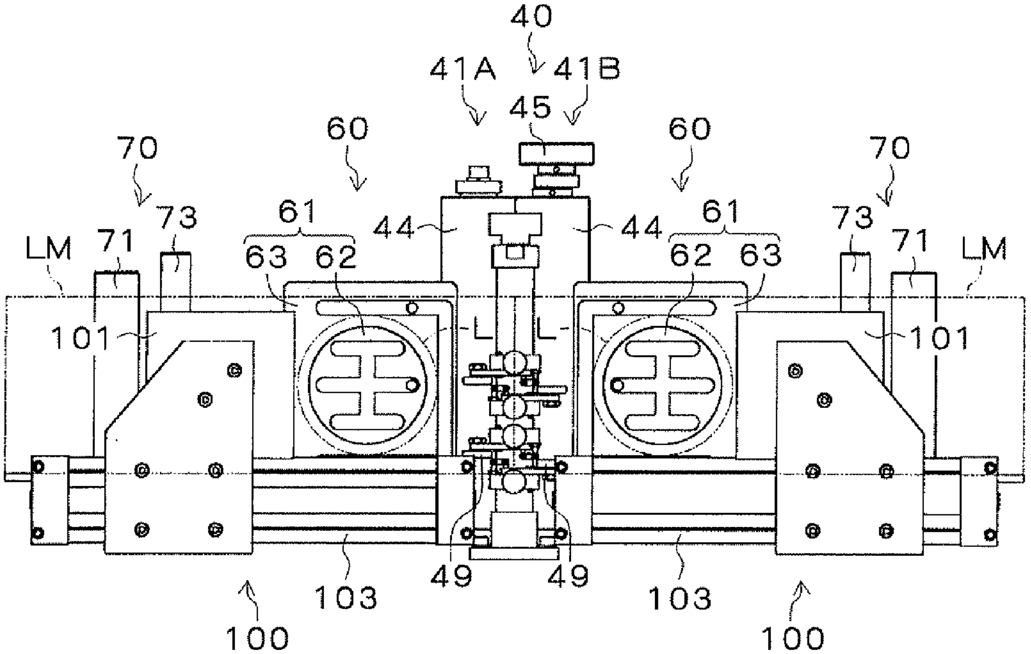

Thus, with the tack labeler 1B, when delivering action for the label formation base materials LM stops, as shown in FIG. 22 (*a*) and (*b*), predetermined-shaped tack labels L are punched out from the label formation base materials LM by pressing the label formation base materials LM to the fixing portions 63 of the suction plates 61 by the punch-out molds 101, and the punched-out tack labels L are suctioned and held by the movable portions 62 of the suction plates 61. Subsequently, as shown in FIG. 23 (*a*) and (*b*), the drive cylinders 102 and the punch-out molds 101 retreat on the side, and the movable portions 62 of the suction plates 61 suctioning and holding the tack labels L advance, resulting in the tack labels L adhering to the containers C stopped in the front at the adherence positions.

It should be noted that, in the above described embodiments, although the separating-delivering unit 40 includes the auxiliary rollers 49 and 49 for nipping each of the label formation base materials LM between the suction driving rollers 41A and 41B, the auxiliary rollers 49 and 49 can be omitted.

Furthermore, when using the auxiliary rollers 49 and 49, instead of the suction driving rollers 41A and 41B, a nip roller including a follower roller and a driving roller not having a suction function may be disposed at the position of the suction driving rollers 41A and 41B.

Furthermore, in the above described label formation base material pair LMP, although the tack label-shaped cut lines CL have the connection portions cp that are perfectly uncut, the connection portions cp may be perforations.

Figure 24:
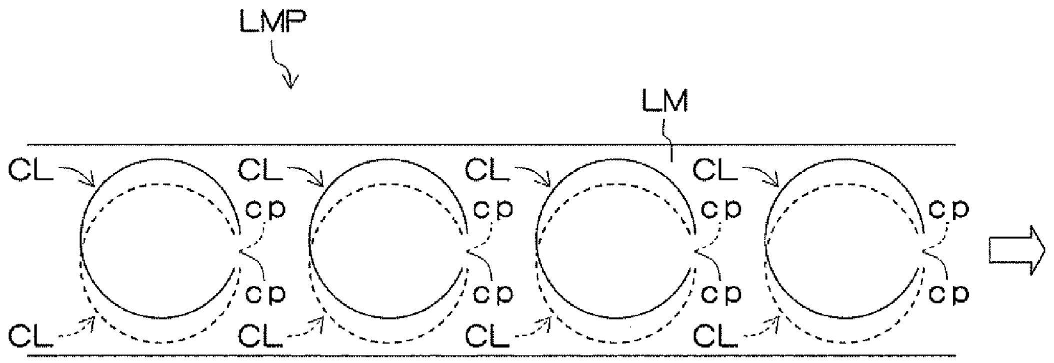
FIG. 24 is a plan view of one of the surfaces of a label formation base material pair which is another embodiment.
Figure 25:
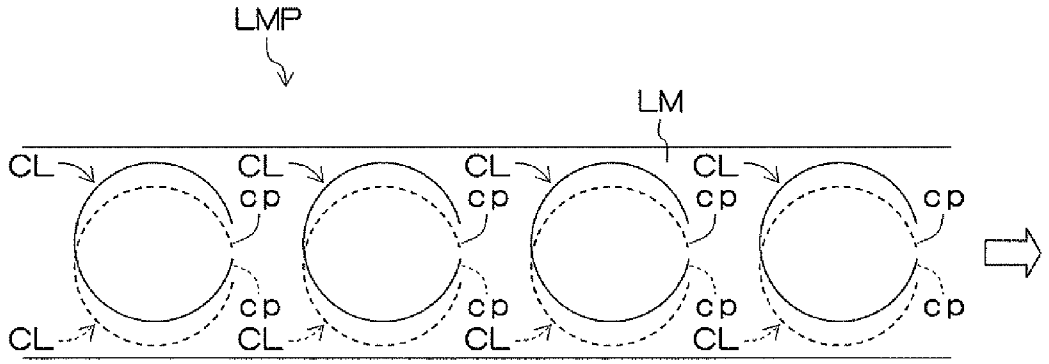
FIG. 25 is a plan view of one of the surfaces of a label formation base material pair which is still another embodiment.

Furthermore, in the above described label formation base material pair LMP, although the cut lines CL formed on one of the label formation base materials LM and the cut lines CL formed on the other label formation base material LM are shifted in position in the longitudinal direction of the label formation base materials LM so as not to match each other, the present invention is not limited thereto; and, it is also possible to, for example, shift the positions by rotating either one of the cut lines CL or both of the cut lines CL by using mutually matched connection portions cp as centers as shown in FIG. 24, or shift the positions in the width direction of the label formation base materials LM as shown in FIG. 25.

INDUSTRIAL APPLICABILITY

The invention can be applied when automatically adhering tack labels that do not use release papers and that are punched out in shapes such as an ellipse, circle, or the like.

DESCRIPTION OF THE REFERENCE CHARACTERS

1, 1A, 1B tack labeler
10 roll holder
20 reeling-out unit (base material pair delivering means)
21 reeling-out nip roller
22 driving roller
23 follower roller
24 geared motor
25 guide roller
30 base material pair accumulation unit
31 slide base
32 slider
33 dancer roller
34 coil spring
35 guide roller
36 roll detection sensor
40 separating-delivering unit (separating-delivering means)
41A, 41B suction driving roller (separating-delivering roller)
42, 43 central shaft
42*a*, 43*a* main suction passage
42*b*, 43*b* recessed portion
42*c*, 43*c* communication passage
42*d*, 43*d* connection elbow
43D lower shaft
43M middle shaft
43U upper shaft
44 roller tube
44*a* suction holes
44A main body portion
44B cover portion
45 knob
46 coil spring
47 servomotor
48A, 48B gear
49 auxiliary roller
50 cutting units (cutting means)
60 adhering units (adhering means)
61 suction plates
62 movable portions
62*a* suction holes
62*b* suction grooves
63 fixing portions
63*a* suction holes
63*b* suction grooves
64 drive cylinders
70 base material collecting units (base material collecting means)
71 wind-up reels
72 geared motors
73 guide rollers
81 mark sensor
82 suction blower
83 air valve
90 laser cutter (cut-line forming means)
100 punch-out units (cut-out means)
101 punch-out molds
102, 103 drive cylinders C containers CL cut lines cp connection portions AL adhesive layers BL base material layers IL indicated print layers PL non-adhesive layers LM label formation base materials LMP, LMP1 label formation base material pair MPR base material pair roll L tack labels

The invention claimed is:

1. A label formation base material pair for forming tack labels having a predetermined shape, comprising:

a pair of opposing elongated label formation base materials, each of the base materials being configured to cut therefrom the tack labels and each of the base materials including at least a base layer and an adhesive layer, the base materials being detachably adhered to each other on respective adherence surface sides of the adhesive layers, the adhesive layers of the label formation base materials each including elongate bands of adhesive areas, which alternate with elongate bands of non-adhesive areas, an adhesive area of one of the label formation base materials is attached to a non-adhesive area of the opposing label formation base material;

each of the label formation base materials having formed thereon, successively in a direction of elongation of the label formation base materials and at a predetermined interval, cut lines that define an interior area portion in the shape of the tack labels, the cut lines formed on opposing label formation base materials at the same predetermined interval defining interior area portions having the same shape as each other, each interior area portion being defined by a single continuous cut line and each cut line defining a single uncut connection portion between opposing ends of the cut line, the connection portion being located at one end side of the tack labels in the direction of elongation where opposing connection portions are pulled away opposite from each other in a peeling direction of the opposing elongated label formation base materials;

the cut lines formed on one of the label formation base materials and the cut lines formed on the other label formation base material being shifted in position so as not to match each other; and the pair of elongated label formation base materials being configured to facilitate removal of the tack labels via movement in an advancing direction along the direction of elongation, each connection portion being disposed forward of its corresponding cut line in the advancing direction and the connection portion being configured to allow the interior area portion to be detached from the opposing base material upon separation of the base materials, the interior area portions being removable as the tack labels from the remainder of each of the base materials when the connection portions are cut, and wherein each of the tack labels removed from the base materials includes at least a base layer and an adhesive layer, and each tack label has the same shape.

2. The label formation base material pair of claim 1, wherein opposing cut lines are shifted relative to each other in the longitudinal direction of the label formation base materials such that the entire connection portion of the one label formation base material does not overlap the entire opposing connection portion of the other label formation base material.

3. The label formation base material pair of claim 1, wherein opposing cut lines are shifted by rotating at least one of the opposing cut lines relative to the other opposing cut line about the connection portion at a single rotation center on both of the one label formation base material and the other label formation base material, and wherein the opposing cut lines have overlapping connection portions on both of the one label formation base material and the other label formation base material.

4. The label formation base material pair of claim 1, wherein opposing cut lines are shifted relative to each other in the width direction of the label formation base materials such that the entire connection portion of the one label formation base material does not overlap the entire opposing connection portion of the other label formation base material.

5. The label formation base material pair of claim 1, wherein the shape of the cut lines formed on opposing label formation base materials at the same predetermined interval defining interior area portions is selected from an ellipse, a circle, an ellipse-like shape, and a circle-like shape.

6. A tack labeler for forming tack labels from the label formation base material pair of claim 1, the tack labeler comprising:

separating-delivering means that deliver the label formation base material pair from an end on a side of the connection portions, and separates the delivered label formation base material pair into the respective label formation base materials;

cutting means that successively cut the connection portions formed on each of the separated label formation base materials so as to form individual tack labels; and adhering means that adhere the formed individual tack labels onto adherence objects, wherein the separating-delivering means includes a pair of separating-delivering rollers that are disposed on both sides of the label formation base material pair, the pair of separating-delivering rollers are configured so as to nip the label formation base material pair, and configured to deliver each of the separated label formation base materials in directions away from each other while the label formation base materials move along outer peripheral surfaces of the separating-delivering rollers.

7. A method for producing tack labels from the label formation base material pair of claim 1, the method comprising:

delivering the label formation base material pair from an end on a side of the connection portions, and separating the delivered label formation base material pair into the respective label formation base materials;

cutting the connection portions formed on each of the separated label formation base materials so as to form individual tack labels; and adhering the formed individual tack labels onto adherence objects.

* * * * *